(12) United States Patent
Geng et al.

(10) Patent No.: US 12,181,633 B2
(45) Date of Patent: Dec. 31, 2024

(54) OPTICAL IMAGING LENS ASSEMBLY

(71) Applicant: ZHEJIANG SUNNY OPTICS CO.,LTD., Zhejiang (CN)

(72) Inventors: Xiaoting Geng, Zhejiang (CN); Xinquan Wang, Zhejiang (CN); Fujian Dai, Zhejiang (CN); Liefeng Zhao, Zhejiang (CN)

(73) Assignee: ZHEJIANG SUNNY OPTICS CO., LTD., Ningbo (CN)

( * ) Notice: Subject to any disclaimer, the term of this patent is extended or adjusted under 35 U.S.C. 154(b) by 522 days.

(21) Appl. No.: 17/612,582

(22) PCT Filed: Apr. 22, 2020

(86) PCT No.: PCT/CN2020/086084
§ 371 (c)(1),
(2) Date: Nov. 19, 2021

(87) PCT Pub. No.: WO2020/238495
PCT Pub. Date: Dec. 3, 2020

(65) Prior Publication Data
US 2022/0236526 A1   Jul. 28, 2022

(30) Foreign Application Priority Data

May 24, 2019 (CN) .......................... 201910437472.6

(51) Int. Cl.
*G02B 13/00* (2006.01)
*G02B 9/34* (2006.01)

(52) U.S. Cl.
CPC ............. *G02B 13/004* (2013.01); *G02B 9/34* (2013.01)

(58) Field of Classification Search
CPC ..... G02B 13/004; G02B 13/0015; G02B 9/34
(Continued)

(56) References Cited

U.S. PATENT DOCUMENTS

| 2014/0098432 | A1  | 4/2014 | Kubota et al. |
| 2015/0227021 | A1* | 8/2015 | Huang ............... G02B 13/0015 348/360 |

(Continued)

FOREIGN PATENT DOCUMENTS

| CN | 201917707 U  | 8/2011 |
| CN | 102566013 A  | 7/2012 |

(Continued)

OTHER PUBLICATIONS

The search report of family CN application No. 2019104374726 issue on May 24, 2019.

*Primary Examiner* — Stephone B Allen
*Assistant Examiner* — Boutsikaris Leonidas
(74) *Attorney, Agent, or Firm* — Samson G. Yu

(57) ABSTRACT

The disclosure provides an optical imaging lens assembly, which sequentially includes, from an object side to an image side along an optical axis: a first lens with a negative refractive power; a second lens with a refractive power, an image-side surface thereof being a convex surface; a third lens with a refractive power, an object-side surface thereof being a convex surface; and a fourth lens with a negative refractive power, an object-side surface thereof being a convex surface while an image-side surface being a concave surface. ImgH is a half of a diagonal length of an effective pixel region on an imaging surface of the optical imaging lens assembly, and a spacing distance T12 of the first lens and the second lens on the optical axis, a spacing distance T23 of the second lens and the third lens on the optical axis and ImgH satisfy: $0.4<(T12+T23)/ImgH<0.6$.

19 Claims, 15 Drawing Sheets

(58) Field of Classification Search
USPC .......................................................... 359/781
See application file for complete search history.

(56) References Cited

U.S. PATENT DOCUMENTS

2018/0011290 A1* 1/2018 Bone .................. G02B 27/0025
2021/0373287 A1* 12/2021 Lin ........................ G02B 13/18

FOREIGN PATENT DOCUMENTS

| | | |
|---|---|---|
| CN | 104834075 A | 8/2015 |
| CN | 106468816 A | 3/2017 |
| CN | 106468817 A | 3/2017 |
| CN | 108693632 A | 10/2018 |
| CN | 110045488 A | 7/2019 |
| CN | 210015279 U | 2/2020 |
| CN | 111722360 A | 9/2020 |
| CN | 111766678 A | 10/2020 |

* cited by examiner

OPTICAL IMAGING LENS ASSEMBLY

CROSS-REFERENCE TO RELATED APPLICATION(S)

The disclosure claims priority to and the benefit of Chinese Patent Application No. 201910437472.6, filed in the China National Intellectual Property Administration (CNIPA) on 24 May 2019, which is incorporated herein by reference in its entirety.

TECHNICAL FIELD

The disclosure relates to an optical imaging lens assembly, and particularly to an optical imaging lens assembly including four lenses.

BACKGROUND

At present, requirements on imaging functions of portable electronic devices increase. Images may usually be processed in combination with image processing algorithms. However, an optical characteristic of an optical imaging lens assembly directly affects the imaging quality of an initial image, so requirements on the performance of optical imaging lens assemblies matched with portable electronic devices also increase.

For example, there is a trend in the mobile phone industry to use multiple optical imaging lens assemblies as multiple cameras. The multiple optical imaging lens assemblies highlight different optical characteristics respectively, usually including an optical imaging lens assembly with a relatively wide field of view (FOV), and then a wide shooting field of view is achieved in combination with an image processing algorithm. However, a portable electronic device is expected to be as small as possible, so an optical imaging lens assembly arranged thereon is expected to include a relatively small number of lenses. In addition, in order to achieve high imaging quality, the lens may be relatively difficult to machine.

SUMMARY

Some embodiments of the disclosure provide an optical imaging lens assembly, for example, a wide-angle prime optical imaging lens assembly, capable of at least overcoming or partially overcoming at least one shortcoming in a prior art.

In an embodiment, the disclosure provides an optical imaging lens assembly, which may sequentially include, from an object side to an image side along an optical axis: a first lens with a negative refractive power; a second lens with a refractive power, an image-side surface thereof being a convex surface; a third lens with a refractive power, an object-side surface thereof being a convex surface; and a fourth lens with a negative refractive power, an object-side surface thereof being a convex surface while an image-side surface being a concave surface.

In an implementation mode, ImgH is a half of a diagonal length of an effective pixel region on an imaging surface of the optical imaging lens assembly, and a spacing distance T12 of the first lens and the second lens on the optical axis, a spacing distance T23 of the second lens and the third lens on the optical axis and ImgH may satisfy: $0.4<(T12+T23)/ImgH<0.6$.

In an implementation mode, the optical imaging lens assembly may further comprise a diaphragm, the diaphragm is arranged between the first lens and the second lens.

In an implementation mode, TTL is a distance from an object-side surface of the first lens to an imaging surface of the optical imaging lens assembly on the optical axis, and a center thickness CT2 of the second lens on the optical axis, a center thickness CT3 of the third lens on the optical axis and TTL may satisfy: $1.4<(CT2+CT3)/TTL\times 5<1.9$.

In an implementation mode, an effective radius DT22 of the image-side surface of the second lens, an effective radius DT32 of an image-side surface of the third lens and an effective radius DT42 of the image-side surface of the fourth lens may satisfy: $1.0<(DT22+DT32)/DT42<1.3$.

In an implementation mode, ImgH is a half of a diagonal length of an effective pixel region on an imaging surface of the optical imaging lens assembly, and an effective radius DT11 of an object-side surface of the first lens, an effective radius DT12 of an image-side surface of the first lens and ImgH may satisfy: $0.8<(DT11+DT12)/ImgH<1.2$.

In an implementation mode, Semi-FOV is a half of a maximum field of view of the optical imaging lens assembly, and Semi-FOV may satisfy: $55°\leq Semi\text{-}FOV\leq 70°$.

In an implementation mode, an effective focal length f4 of the fourth lens and an effective focal length f1 of the first lens may satisfy: $0.1<f4/f1<1$.

In an implementation mode, an effective focal length f2 of the second lens, an effective focal length f3 of the third lens and an effective focal length f of the optical imaging lens assembly may satisfy: $2.3<(f2+f3)/f<3.8$.

In an implementation mode, an effective focal length f2 of the second lens and a curvature radius R2 of an image-side surface of the first lens may satisfy: $0.1<f2/R2<1.8$.

In an implementation mode, a curvature radius R4 of the image-side surface of the second lens and a curvature radius R6 of an image-side surface of the third lens may satisfy: $0.2<R4/R6<2.3$.

In an implementation mode, a curvature radius R7 of the object-side surface of the fourth lens and a curvature radius R8 of the image-side surface of the fourth lens may satisfy: $1.5<R7/R8<2.7$.

In an implementation mode, an Abbe number V1 of the first lens may satisfy: $V1>55$, and an Abbe number V2 of the second lens may satisfy: $V2>55$.

The disclosure provides an optical imaging lens assembly including multiple (for example, four) lenses. The refractive power and surface types of each lens, the center thickness of each lens, on-axis distances between the lenses and the like are reasonably configured to achieve the beneficial effects of small size and high imaging quality of the optical imaging lens assembly. In addition, ImgH is a half of the diagonal length of the effective pixel region on the imaging surface of the optical imaging lens assembly, and a ratio of a sum of the spacing distance T12 of the first lens and the second lens on the optical axis and the spacing distance T23 of the second lens and the third lens on the optical axis to ImgH is controlled to make the optical imaging lens assembly small and reduce the strength of a ghost image generated by a spacing between the first lens and the second lens and the strength of a ghost image generated by a spacing between the second lens and the third lens, so that the imaging quality is further improved. Moreover, the third lens is relatively thick in circumference and relatively high in machinability, so that difficulties in the manufacturing of the optical imaging lens assembly are reduced.

BRIEF DESCRIPTION OF THE DRAWINGS

The above and other advantages of the implementation modes of the disclosure become apparent upon the detailed descriptions made with reference to the following drawings. The drawings are intended to show rather than limit exemplary implementation modes of the disclosure. In the drawings.

DETAILED DESCRIPTION OF THE EMBODIMENTS

Figure 1:
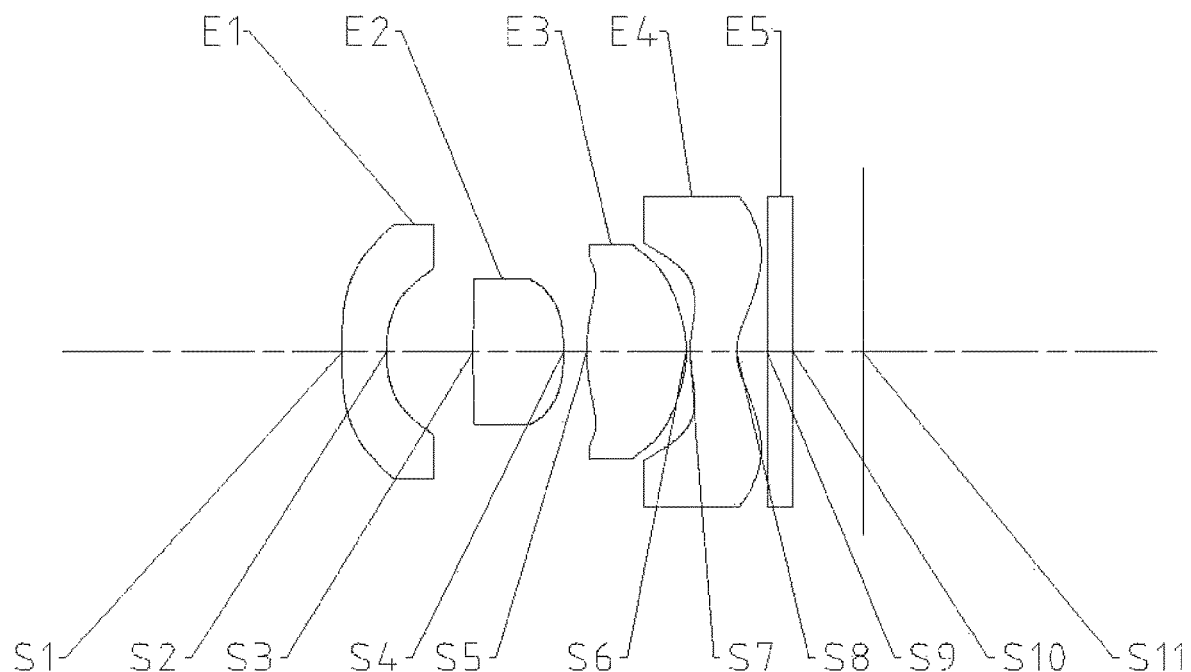
FIG. 1 shows a schematic structure diagram of an optical imaging lens assembly according to Embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, and the like are only used to distinguish one feature from another feature, and do not represent any limitation to the feature. Thus, a first lens of an optical imaging lens assembly discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. In each lens, a surface closest to a shot object is called an object-side surface of the lens. In each lens, a surface closest to an imaging surface is called an image-side surface of the lens.

It should also be understood that terms "include", "including", "have", "contain", and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings as commonly understood by those of ordinary skill in the art of the disclosure. It should also be understood that the terms (for example, terms defined in a common dictionary) should be explained to have the same meanings as those in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles, and other aspects of the disclosure will be described below in detail.

An optical imaging lens assembly according to an exemplary implementation mode of the disclosure may include a first lens, a second lens, a third lens, and a fourth lens. The four lenses are sequentially arranged from an object side to an image side along an optical axis. In the first lens to the fourth lens, there may be a spacing distance between any two adjacent lenses.

In an exemplary embodiment, the first lens may have a negative refractive power. The second lens has a refractive power, and an image-side surface thereof is a convex surface. The third lens has a refractive power, and an object-side surface thereof is a convex surface. The fourth has a negative refractive power, and an object-side surface thereof is a convex surface, while an image-side surface is a concave surface. The refractive power of the lenses is configured reasonably to correct an off-axis aberration of the optical imaging lens assembly and improve the imaging quality. The first lens with a negative refractive power may converge light effectively. The image-side surface of the second lens is a convex surface, and the object-side surface of the third lens is a convex surface, so that the aberration correction capability of the lens assembly may be improved effectively. The fourth lens with a negative refractive power is favorable for the configuration of the refractive power of each lens and ensures a wide field of view (FOV) and wide imaging range of the optical imaging lens assembly and low sensitivity of a system. The object-side surface of the fourth lens is a convex surface, while the image-side surface is a concave surface, so that a longitudinal chromatic aberration and lateral chromatic aberration of the lens are balanced.

In an exemplary embodiment, the optical imaging lens assembly of the disclosure may satisfy conditional expression $0.4<(T12+T23)/\text{ImgH}<0.6$, wherein T12 is a spacing distance of the first lens and the second lens on the optical axis, T23 is a spacing distance of the second lens and the third lens on the optical axis, and ImgH is a half of a diagonal length of an effective pixel region on an imaging surface of the optical imaging lens assembly. Exemplarily, the optical imaging lens assembly of the disclosure may satisfy conditional expression $0.4<(T12+T23)/\text{ImgH}<0.55$. A range of a value of $(T12+T23)/\text{ImgH}$ is set, so that the first lens, the second lens and the third lens may be distributed reasonably and matched with the imaging surface to make the optical imaging lens assembly small. The strength of a ghost image generated by the spacing distance T12 of the first lens and the second lens on the optical axis is weak, and the strength of a ghost image generated by the spacing distance T23 of the second lens and the third lens on the optical axis is weak. The third lens may be matched with the first two lenses relatively well, so that the third lens is relatively thick in circumference and relatively high in machinability, and a chromatic aberration of the optical imaging lens assembly may be reduced to further improve the imaging quality.

In an exemplary embodiment, the optical imaging lens assembly may further comprises a diaphragm, the diaphragm is arranged between the first lens and the second lens. The diaphragm is arranged between the first lens and the second lens, so that a field of view (FOV) of the optical imaging system may be enlarged, the imaging range may be enlarged, and the aberration of the optical imaging system generated by production and other factors may be reduced by the diaphragm arranged in the middle to improve the yield.

In an exemplary embodiment, the optical imaging lens assembly may satisfy conditional expression $1.4<(CT2+CT3)/\text{TTL}\times5<1.9$, wherein CT2 is a center thickness of the second lens on the optical axis, CT3 is a center thickness of the third lens on the optical axis, and TTL is a distance from an object-side surface of the first lens to the imaging surface of the optical imaging lens assembly on the optical axis. Exemplarily, the optical imaging lens assembly may satisfy conditional expression $1.47\leq(CT2+CT3)/\text{TTL}\times5\leq0.82$. A ratio of a sum of the center thickness of the second lens and the center thickness of the third lens to the distance from the object-side surface of the first lens to the imaging surface of the optical imaging lens assembly on the optical axis is controlled, so that the second lens and the third lens are high in machinability, and the overall size of the optical imaging lens assembly is reduced. The strength of ghost images generated by the second lens and the third lens respectively is relatively weak, and the first lens is matched to reduce the chromatic aberration and distortion of an image formed by the optical imaging lens assembly. In addition, a center thickness of the third lens may not be too large, which is favorable for reducing the sensitivity of the optical imaging lens assembly.

In an exemplary embodiment, the optical imaging lens assembly may satisfy conditional expression $1.0<(DT22+DT32)/DT42<1.3$, wherein DT22 is an effective radius of the image-side surface of the second lens, DT32 is an effective radius of an image-side surface of the third lens, and DT42 is an effective radius of the image-side surface of the fourth lens. Exemplarily, the optical imaging lens assembly may satisfy conditional expression $1.05<(DT22+DT32)/DT42<1.25$, e.g., $1.05<(DT22+DT32)/DT42<1.20$. The effective radius of the respective image-side surfaces of the second lens, the third lens and the fourth lens are controlled, so that a luminous flux of the optical imaging lens assembly may be improved, a relative illumination in a marginal field of view (FOV) is effectively improved, and the optical imaging lens assembly is endowed with relatively high imaging quality in a relatively dark environment.

In an exemplary embodiment, the optical imaging lens assembly may satisfy conditional expression $0.8<(DT11+DT12)/\text{ImgH}<1.2$, wherein DT11 is an effective radius of an object-side surface of the first lens, DT12 is an effective radius of an image-side surface of the first lens, and ImgH is a half of the diagonal length of the effective pixel region on the imaging surface of the optical imaging lens assembly. Exemplarily, the optical imaging lens assembly may satisfy conditional expression $0.9<(DT11+DT12)/\text{ImgH}<1.2$, e.g., $0.9<(DT11+DT12)/\text{ImgH}<1.1$. The effective radius of the object-side surface and image-side surface of the first lens and a half of the diagonal length of the effective pixel region on the imaging surface are controlled, so that an illumination of the optical imaging lens assembly is controlled to achieve relatively high imaging quality in a relatively dark environment. In addition, an effect of controlling a depth of the optical imaging lens assembly to realize a small window is further achieved. The optical imaging lens assembly provided in the disclosure is suitable to be matched with another camera in, for example, a multi-camera mobile phone.

In an exemplary embodiment, the optical imaging lens assembly may satisfy conditional expression $55°\leq\text{Semi-FOV}\leq70°$, wherein Semi-FOV is a half of a maximum field of view of the optical imaging lens assembly. A half of the maximum field of view is controlled, so that an image formed by the optical imaging lens assembly has a relatively large image height, meanwhile, an aberration in a marginal field of view is reduced, and the optical imaging lens assembly has the effects of wide imaging range and high imaging quality.

In an exemplary embodiment, the optical imaging lens assembly may satisfy conditional expression $0.1<f4/f1<1$, wherein f4 is an effective focal length of the fourth lens, and f1 is an effective focal length of the first lens. Exemplarily, the optical imaging lens assembly may satisfy conditional expression $0.35<f4/f1<1$, e.g., $0.1<f4/f1<0.7$. A ratio of the effective focal length of the first lens to the effective focal length of the fourth lens is controlled, so that the respective refractive power of the four lenses is adapted, the third lens is prevented from excessively high refractive power, the optical imaging lens assembly is low in sensitivity and high in imaging quality, and meanwhile, the optical imaging lens assembly has a relatively small total optical length.

In an exemplary embodiment, the optical imaging lens assembly may satisfy conditional expression $2.3<(f2+f3)/f<3.8$, wherein f2 is an effective focal length of the second lens, f3 is an effective focal length of the third lens, and f is an effective focal length of the optical imaging lens assembly. Exemplarily, the optical imaging lens assembly may satisfy conditional expression 2.6<(f2+f3)/f<3.8, e.g., 2.6<(f2+f3)/f<3.3. The effective focal length of the second lens, the effective focal length of the third lens and the focal length of the optical imaging lens assembly are controlled, so that the optical imaging lens assembly is relatively high in aberration correction capability, and the size of the optical imaging lens assembly is relatively small, and each lens is relatively high in machinability.

In an exemplary embodiment, the optical imaging lens assembly may satisfy conditional expression 0.1<f2/R2<1.8, wherein f2 is an effective focal length of the second lens, and R2 is a curvature radius of an image-side surface of the first lens. Exemplarily, the optical imaging lens assembly may satisfy conditional expression 0.1<f2/R2<0.6, e.g., 0.18<f2/R2<0.55. The effective focal length of the second lens and the curvature radius of the image-side surface of the first lens are controlled, so that an astigmatism contribution and coma contribution of the second lens are relatively low, and astigmatisms and comas generated by the first lens, the third lens and the fourth lens may be balanced to achieve high imaging quality of the optical imaging lens assembly.

In an exemplary embodiment, the optical imaging lens assembly may satisfy conditional expression 0.2<R4/R6<2.3, wherein R4 is a curvature radius of the image-side surface of the second lens, and R6 is a curvature radius of an image-side surface of the third lens. Exemplarily, the optical imaging lens assembly may satisfy conditional expression 0.11<R4/R6<2.3, e.g., 0.13<R4/R6<2.3. The curvature radius of the image-side surface of the second lens and the curvature radius of the image-side surface of the third lens are controlled, so that astigmatisms and comas generated by the second lens and the third lens respectively may be balanced effectively to achieve high imaging quality of the optical imaging lens assembly.

In an exemplary embodiment, the optical imaging lens assembly may satisfy conditional expression 1.5<R7/R8<2.7, wherein R7 is a curvature radius of the object-side surface of the fourth lens, and R8 is a curvature radius of the image-side surface of the fourth lens. Exemplarily, the optical imaging lens assembly may satisfy conditional expression 2.0<R7/R8<2.7, e.g., 2.5<R7/R8<2.7. The curvature radius of the object-side surface of the fourth lens and the curvature radius of the image-side surface of the fourth lens are controlled, so that the refractive power of the optical imaging lens assembly is distributed to each lens in a balanced manner, and furthermore, a longitudinal chromatic aberration and a lateral chromatic aberration are balanced.

In an exemplary embodiment, the optical imaging lens assembly may satisfy conditional expression V1>55, and V2>55, wherein V1 is an Abbe number of the first lens, and V2 is an Abbe number of the second lens. Exemplarily, V1>55.5, and V2>55.5. The respective Abbe numbers of the first lens and the second lens are controlled, so that chromatic dispersions of the first lens and the second lens are relatively low, an imaging chromatic aberration of the optical imaging lens assembly is low, and an object may be imaged more clearly.

Optionally, the optical imaging lens assembly may further include an optical filter configured to correct the chromatic aberration and/or protective glass configured to protect a photosensitive element on the imaging surface.

The camera lens assembly group according to the implementation mode of the disclosure may adopt multiple lenses, for example, the abovementioned four. The refractive power and surface types of each lens, the center thickness of each lens, on-axis distances between the lenses and the like are reasonably configured to effectively reduce the size of the lens assembly, reduce the sensitivity of the lens assembly, improve the machinability of the lens assembly and ensure that the camera lens assembly group is more favorable for production and machining and applicable to a portable electronic product.

In the implementation mode of the disclosure, each lens mostly adopts an aspheric mirror surface. At least one mirror surface in the object-side surface of the first lens to the image-side surface of the fourth lens is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With the adoption of the aspheric lens, astigmatic aberrations during imaging may be eliminated as much as possible, thereby improving the imaging quality. Optionally, at least one of the object-side surface and image-side surface of each of the first lens, the second lens, the third lens and the fourth lens may be an aspheric mirror surface. Optionally, both the object-side surface and image-side surface of each of the first lens, the second lens, the third lens and the fourth lens may be aspheric mirror surfaces.

Specific embodiments applied to the optical imaging lens assembly of the abovementioned implementation mode will further be described below with reference to the drawings.

Embodiment 1

Figure 2A:
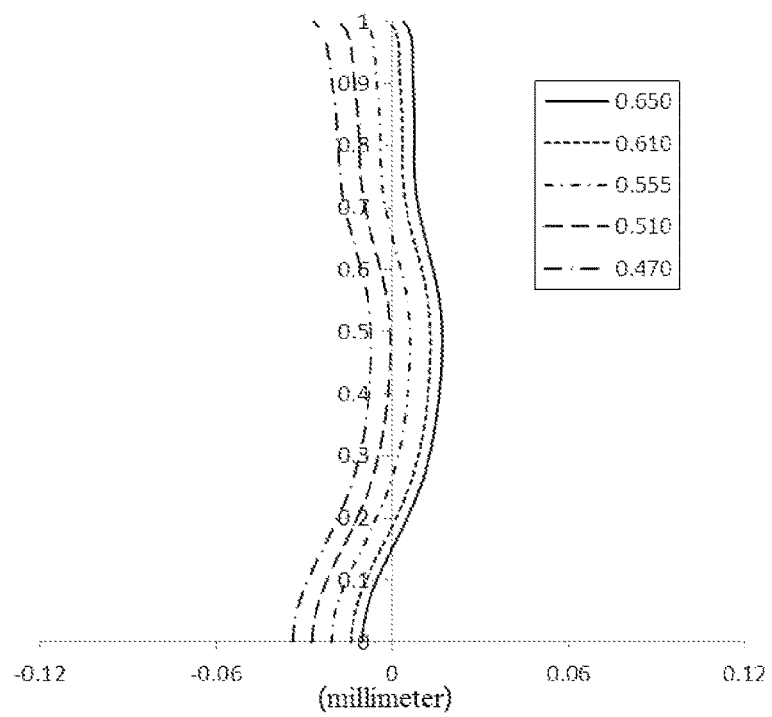
FIGS. 2A-2D sequentially show a longitudinal aberration curve, a lateral color curve, an astigmatism curve and a distortion curve of an optical imaging lens assembly according to Embodiment 1 of the disclosure.
Figure 2B:
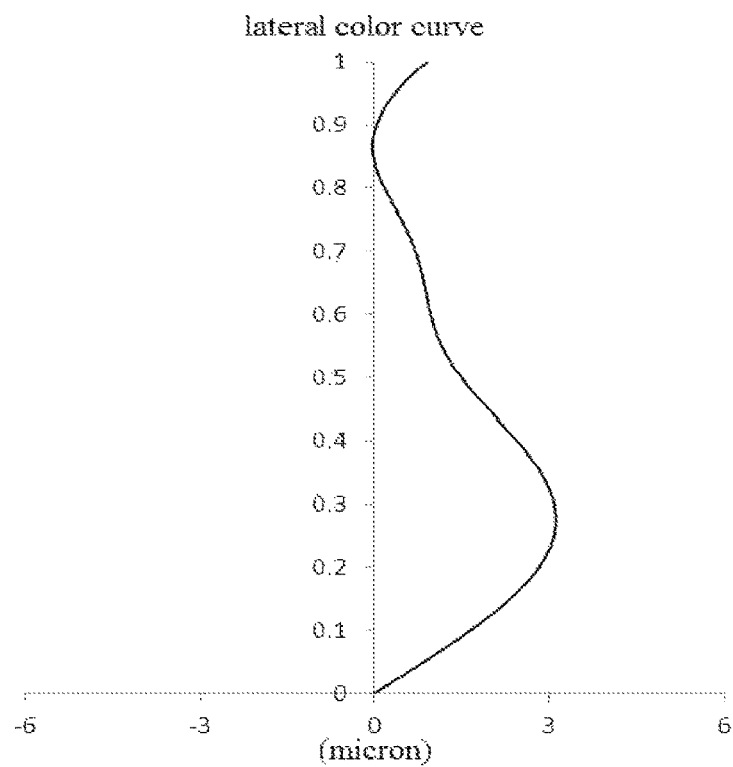
Figure 2C:
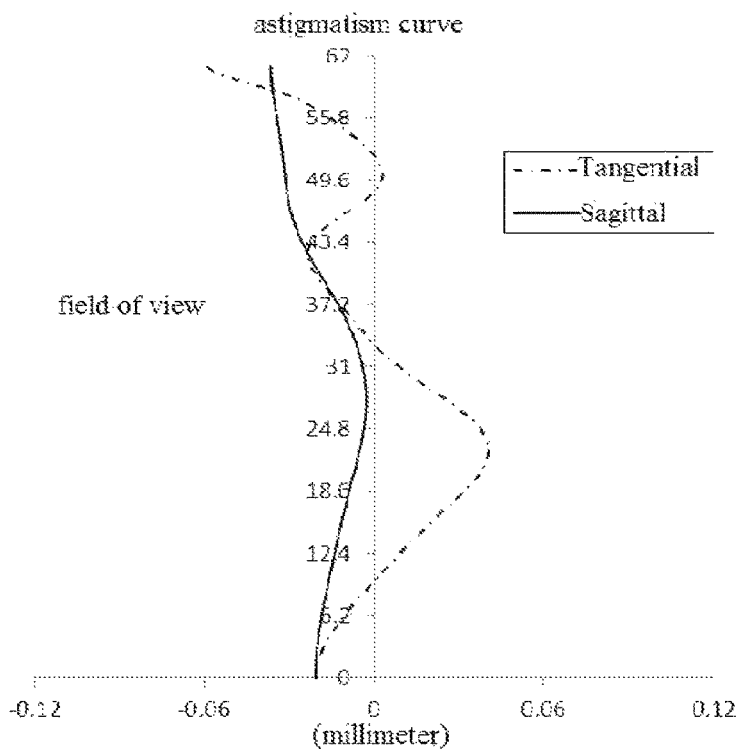
Figure 2D:
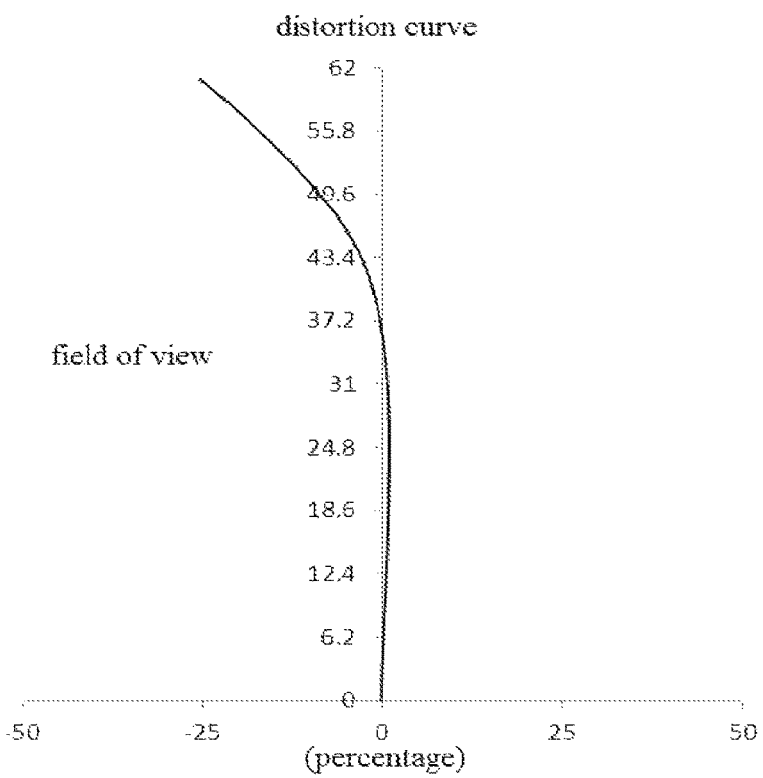

Referring to FIGS. 1-2D, an optical imaging lens assembly of the embodiment sequentially includes, from an object side to an image side along an optical axis, a first lens E1, a second lens E2, a third lens E3, a fourth lens E4, and an optical filter E5. A diaphragm STO (not shown) may be arranged between the first lens E1 and the second lens E2. There may be an air space between any two adjacent lenses.

The first lens E1 has a negative refractive power, an object-side surface S1 thereof is a convex surface, while an image-side surface S2 is a concave surface. The second lens E2 has a positive refractive power, an object-side surface S3 thereof is a convex surface, while an image-side surface S4 is a convex surface. The third lens E3 has a positive refractive power, an object-side surface S5 thereof is a convex surface, while an image-side surface S6 is a convex surface. The fourth lens E4 has a negative refractive power, an object-side surface S7 thereof is a convex surface, while an image-side surface S8 is a concave surface. The optical filter E5 has an object-side surface S9 and an image-side surface S10. The optical imaging lens assembly of the embodiment has an imaging surface 311. Light from an object sequentially penetrates through each surface (S1 to S10) and is finally imaged on the imaging surface $11.

Table 1 shows a table of basic parameters for the optical imaging lens assembly of Embodiment 1, and units of the curvature radius, the thickness and the focal length are all millimeter (mm), specifically as follows.

TABLE 1

| | TTL = 4.19 mm, ImgH = 1.95 mm, Semi-FOV = 61.5°, and f = 1.43 mm | | | | | | |
|---|---|---|---|---|---|---|---|
| | | | | Material | | | |
| Surface number | Surface type | Curvature radius | Thickness/distance | Refractive index | Abbe number | Focal length | Conic coefficient |
| OBJ | Spherical | Infinite | Infinite | | | | |
| S1 | Aspherical | 21.1692 | 0.3555 | 1.54 | 55.9 | −3.53 | 0.0000 |
| S2 | Aspherical | 1.7305 | 0.6980 | | | | 0.0000 |
| STO | Spherical | Infinite | −0.0060 | | | | 0.0000 |
| S3 | Asphencal | 3.8894 | 0.7279 | 1.51 | 55.9 | 2.95 | 0.0000 |
| S4 | Aspherical | −2.3024 | 0.1924 | | | | 1.0210 |
| S5 | Aspherical | 2.1256 | 0.7984 | 1.55 | 56 1 | 1.57 | 0.9980 |
| S6 | Asphencal | −1.2423 | 0.0300 | | | | 0.0000 |
| S7 | Aspherical | 1.3241 | 0.3743 | 1.67 | 20 4 | −2.34 | 0.0000 |
| S8 | Aspherical | 0.6348 | 0.2453 | | | | −0.8408 |
| S9 | Spherical | Infinite | 0.2100 | 1.52 | 64.2 | | |
| S10 | Spherical | Infinite | 0.5602 | | | | |
| S11 | Spherical | Infinite | | | | | |

TTL is a distance from the object-side surface S1 of the first lens E1 to the imaging surface S11 of the optical imaging lens assembly on the optical axis, ImgH is a half of a diagonal length of an effective pixel region on the imaging surface S11, Semi-FOV is a half of a maximum field of view of the optical imaging, lens assembly, and f is an effective focal length of the optical imaging lens assembly.

Both the object-side surface and image-side surface of any one of the first lens E1 to the fourth lens E4 of the optical imaging lens assembly are aspheric surfaces, and a surface type x of each aspheric lens may be defined through, but not limited to, the following aspheric surface formula:

$$x = \frac{ch^2}{1+\sqrt{1-(k+1)c^2h^2}} + \sum A_i h^i, \quad (1)$$

wherein x is a distance vector height from a vertex of the aspheric surface when the aspheric surface is at a height of h along the optical axis direction; c is a paraxial curvature of the aspheric surface, c=1/R (namely, the paraxial curvature c is a reciprocal of the curvature radius R in Table 1); k is a conic coefficient; and Ai is a correction coefficient of the i-th order of the aspheric surface. Table 2 shows higher-order coefficients $A_4$, $A_6$, $A_8$, $A_{10}$, $A_{12}$, $A_{14}$, $A_{16}$, $A_{18}$ and $A_{20}$ that can be used for each of the aspheric surfaces S1 to S8 in Embodiment 1.

FIG. 2A shows a longitudinal aberration curve of the optical imaging lens assembly according to Embodiment 1 to represent deviation of a convergence focal point after light with different wavelengths passes through the optical system. FIG. 2B shows a lateral color curve of the optical imaging lens assembly according to Embodiment 1 to represent deviation of different image heights on the imaging surface after the light passes through the optical system. FIG. 2C shows an astigmatism curve of the optical imaging lens assembly according to Embodiment 1 to represent a tangential image surface curvature and a sagittal image surface curvature. FIG. 2D shows a distortion curve of the optical imaging lens assembly according to Embodiment 1 to represent distortion values corresponding to different fields of view (FOV). According to FIGS. 2A-2D, it can be seen that the optical imaging lens assembly provided in Embodiment 1 may achieve high imaging quality.

Embodiment 2

An optical imaging lens assembly according to Embodiment 2 of the disclosure will be described with reference to FIGS. 3-4D. In the exemplary embodiment and the following embodiments, part of descriptions similar to those about Embodiment 1 are omitted for simplicity.

Figure 3:
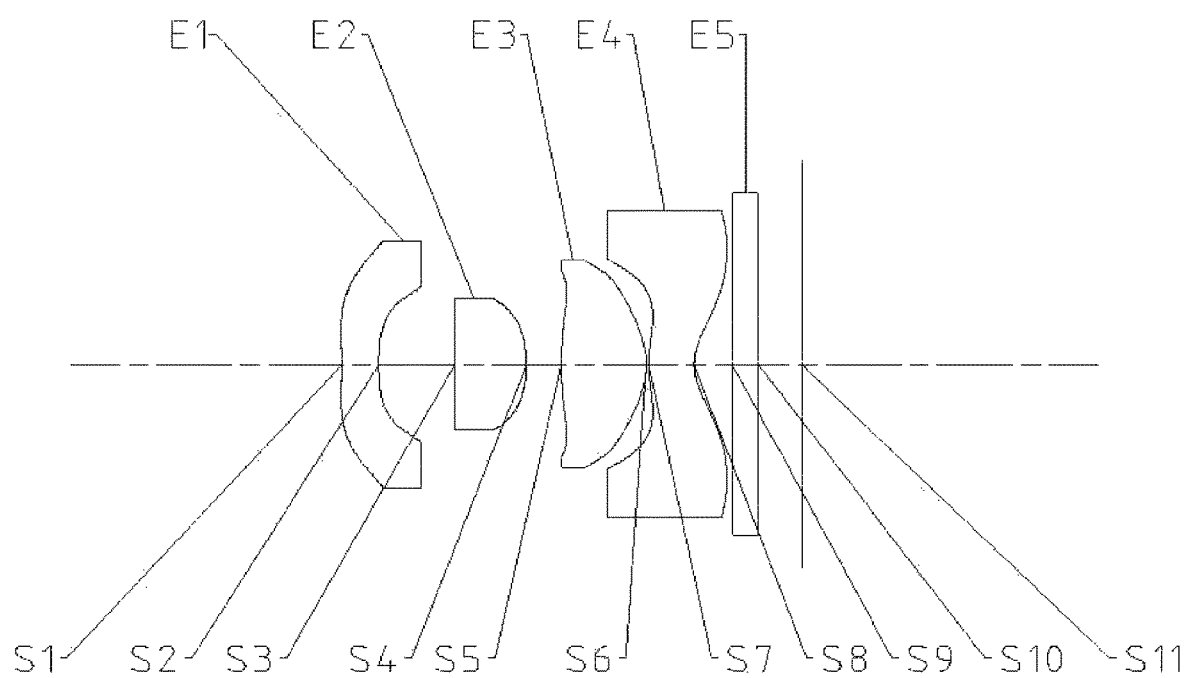
FIG. 3 shows a schematic structure diagram of an optical imaging lens assembly according to Embodiment 2 of the disclosure.

Referring to FIG. 3, an optical imaging lens assembly of the Embodiment 1 sequentially includes, from an object side to an image side along an optical axis, a first lens E1, a second lens E2, a third lens E3, a fourth lens E4, and an optical filter E5. A diaphragm STO (not shown) may be arranged between the first lens E1 and the second lens E2. There may be an air space between any two adjacent lenses.

TABLE 2

| Surface number | A4 | A6 | A8 | A10 | A12 | A14 | A16 | A18 | A20 |
|---|---|---|---|---|---|---|---|---|---|
| S1 | 3.8652E−01 | −1.7473E−01 | −5.1803E−01 | 1.7045E+00 | −2.2874E+00 | 1.6344E+00 | −6.0768E−01 | 9.0975E−02 | 0.0000E+00 |
| S2 | 4.6247E−01 | 3.6442E+00 | −3.3946E+01 | 1.6900E+02 | −4.9242E+02 | 8.4770E+02 | −8.0284E+02 | 3.1931E+02 | 0.0000E+00 |
| S3 | −6.9278E−01 | 2.5705E+01 | −9.4675E+02 | 1.9860E+04 | −2.5630E+05 | 2.0513E+06 | −9.8983E+06 | 2.6273E+07 | −2.9327E+07 |
| S4 | −1.0043E−01 | −7.2035E+00 | 5.1719E+01 | −2.1610E+02 | 4.9091E+02 | −4.9768E+02 | −8.2424E+01 | 5.2291E+02 | −2.4234E+02 |
| S5 | 1.6008E−01 | −2.5374E+00 | 1.0349E+01 | −2.5414E+01 | 2.5635E+01 | 2.5941E+01 | −1.0605E+02 | 1.1396E+02 | −4.2522E+01 |
| S6 | 6.2659E−01 | −3.2412E+00 | 1.0826E+01 | −1.6470E+01 | 1.4734E+00 | 2.9591E+01 | −4.1643E+01 | 2.4086E+01 | −5.1773E+00 |
| S7 | −7.9114E−01 | −1.7444E+00 | 4.4137E+00 | 2.6199E+00 | −2.3053E+01 | 3.3515E+01 | −2.0361E+01 | 4.5947E+00 | 0.0000E+00 |
| S8 | −1.5702E+00 | 1.8461E+00 | −1.3994E+00 | 2.1047E−01 | 6.3147E−01 | −6.5092E−01 | 3.0380E−01 | −7.2310E−02 | 7.0335E−03 |

The first lens E1 has a negative refractive power, an object-side surface S1 thereof is a concave surface, while an image-side surface S2 is a concave surface. The second lens E2 has a positive refractive power, an object-side surface S3 thereof is a convex surface, while an image-side surface S4 is a convex surface. The third lens E3 has a positive refractive power, an object-side surface S5 thereof is a convex surface, while an image-side surface S6 is a convex surface. The fourth lens E4 has a negative refractive power, an object-side surface S7 thereof is a convex surface, while an image-side surface S8 is a concave surface. The optical filter E5 has an object-side surface S9 and an image-side surface S10. The optical imaging lens assembly of the Embodiment 2 has an imaging surface S11. Light from an object sequentially penetrates through each surface (S1 to S10) and is finally imaged on the imaging surface S11.

Table 3 shows a table of basic parameters for the optical imaging lens assembly of the Embodiment 2, and units of the curvature radius, the thickness and the focal length are all millimeter (mm). Table 4 shows higher-order coefficients that can be used for each aspheric surface of the optical imaging lens assembly of the Embodiment 2. A surface type of each aspheric surface may be defined through formula (1), specifically as follows.

fields of view (FPV). According to FIGS. 4A-4D, it can be seen that the optical imaging lens assembly provided in the Embodiment 2 may achieve high imaging quality.

Embodiment 3

Figure 5:
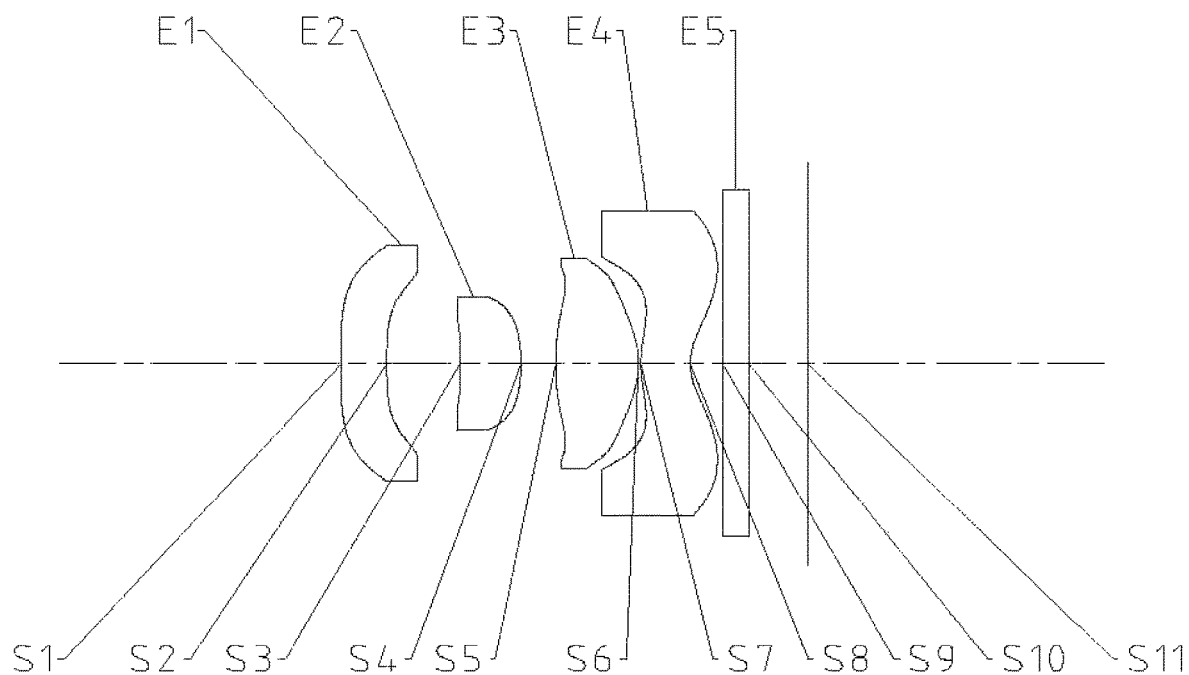
FIG. 5 shows a schematic structure diagram of an optical imaging lens assembly according to Embodiment 3 of the disclosure.

An optical imaging lens assembly according to Embodiment 3 of the disclosure will be described below with reference to FIGS. 5-6D. Referring to FIG. 5, an optical imaging lens assembly of the Embodiment 3 sequentially includes, from an object side to an image side along an optical axis, a first lens E1, a second lens E2, a third lens E3, a fourth lens E4, and an optical filter E5. A diaphragm STO (not shown) may be arranged between the first lens E1 and the second lens E2. There may be an air space between any two adjacent lenses.

The first lens E1 has a negative refractive power, an object-side surface S1 thereof is a concave surface, while an image-side surface S2 is a concave surface. The second lens

TABLE 3

TTL = 3.71 mm, ImgH = 1.95 mm, Semi-FOV = 70.0°, and f = 1.29 mm

| Surface number | Surface type | Curvature radius | Thickness/distance | Material Refractive index | Abbe number | Focal length | Conic coefficient |
|---|---|---|---|---|---|---|---|
| OBJ | Spherical | Infinite | Infinite | | | | |
| S1 | Aspherical | −3.7740 | 0.2989 | 1.54 | 55.9 | −3.67 | 0.0000 |
| S2 | Aspherical | 4.2313 | 0.5906 | | | | 0.0000 |
| STO | Spherical | Infinite | 0.0200 | | | | 0.0000 |
| S3 | Aspherical | 6.5965 | 0.5787 | 1.55 | 56.1 | 2.11 | 0.0000 |
| S4 | Aspherical | −1.3487 | 0.2792 | | | | −2.9110 |
| S5 | Aspherical | 4.4290 | 0.6898 | 1.55 | 56.1 | 1.41 | −99.0000 |
| S6 | Aspherical | −0.8826 | 0.0200 | | | | −1.0000 |
| S7 | Aspherical | 1.6146 | 0.3650 | 1.67 | 20.4 | −1.68 | 0.0000 |
| S8 | Aspherical | 0.6008 | 0.3094 | | | | −1.5232 |
| S9 | Spherical | Infinite | 0.2100 | 1.52 | 64.2 | | |
| S10 | Spherical | Infinite | 0.3508 | | | | |
| S11 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | 8.2840E−01 | −1.5298E+00 | 2.7696E+00 | −3.8137E+00 | 3.6627E+00 | −2.2441E+00 | 7.6803E−01 | −1.1129E−01 | 0.0000E+00 |
| S2 | 1.2102E+00 | −1.7547E+00 | 1.1971E+00 | 2.6924E+01 | −1.5996E+02 | 4.4465E+02 | −6.0333E+02 | 3.1029E+02 | 0.0000E+00 |
| S3 | −4.0935E−01 | 1.5143E+00 | −5.4431E+01 | 6.3812E+02 | −3.8408E+03 | 8.8339E+03 | 0.0000E+00 | 0.0000E+00 | 0.0000E+00 |
| S4 | −3.3675E−01 | −5.8485E+00 | 9.1612E+01 | −9.0234E+02 | 5.4405E+03 | −2.0537E+04 | 4.7185E+04 | −6.0291E+04 | 3.2762E+04 |
| S5 | 2.8070E−01 | −1.4428E+00 | 6.5211E+00 | −2.2062E+01 | 4.5444E+01 | −5.4447E+01 | 3.1264E+01 | −2.4613E+00 | −3.1963E+00 |
| S6 | 8.1850E−01 | −3.3818E+00 | 9.2438E+00 | −8.7175E+00 | −1.5138E+01 | 5.0453E+01 | −5.8298E+01 | 3.2005E+01 | −6.9085E+00 |
| S7 | −4.9718E−01 | −2.5831E+00 | 9.9428E+00 | −1.9799E+01 | 2.4918E+01 | −2.0479E+01 | 9.9500E+00 | −2.1070E+00 | 0.0000E+00 |
| S8 | −1.1927E+00 | 1.9818E+00 | −2.3967E+00 | 2.0960E+00 | −1.2879E+00 | 5.3023E−01 | −1.3558E−01 | 1.8707E−02 | −9.8000E−04 |

Figure 4A:
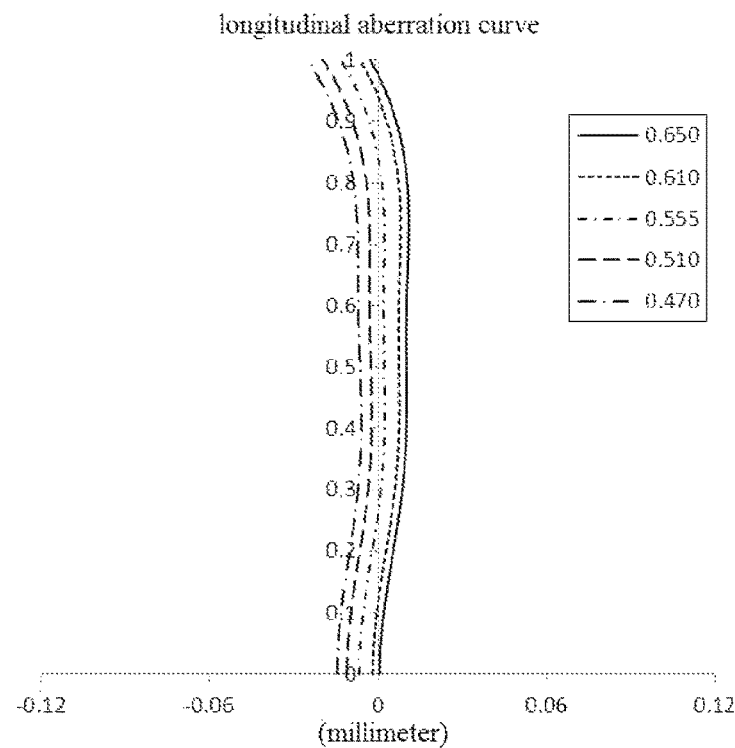
FIGS. 4A-4D sequentially show a longitudinal aberration curve, a lateral color curve, an astigmatism curve and a distortion curve of an optical imaging lens assembly according to Embodiment 2 of the disclosure.
Figure 4B:
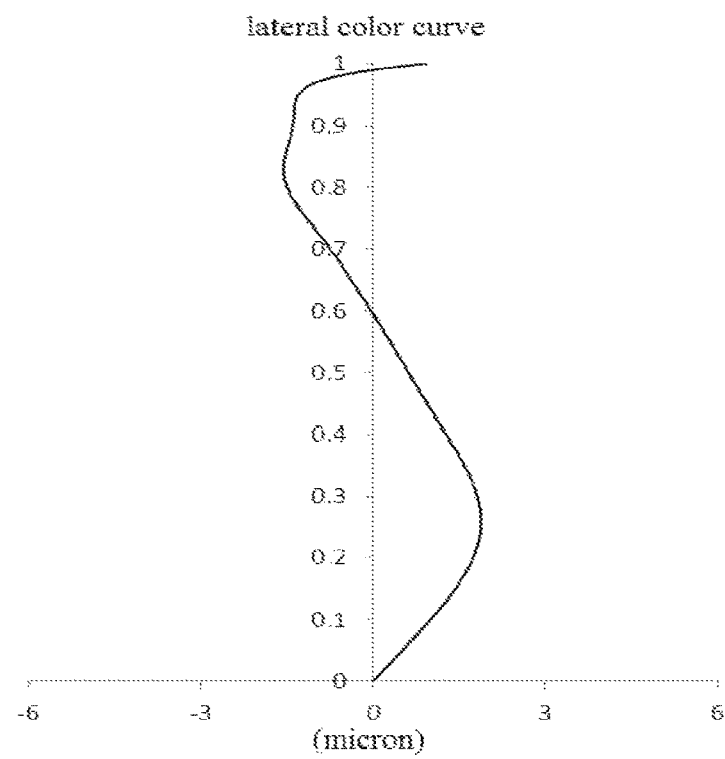
Figure 4C:
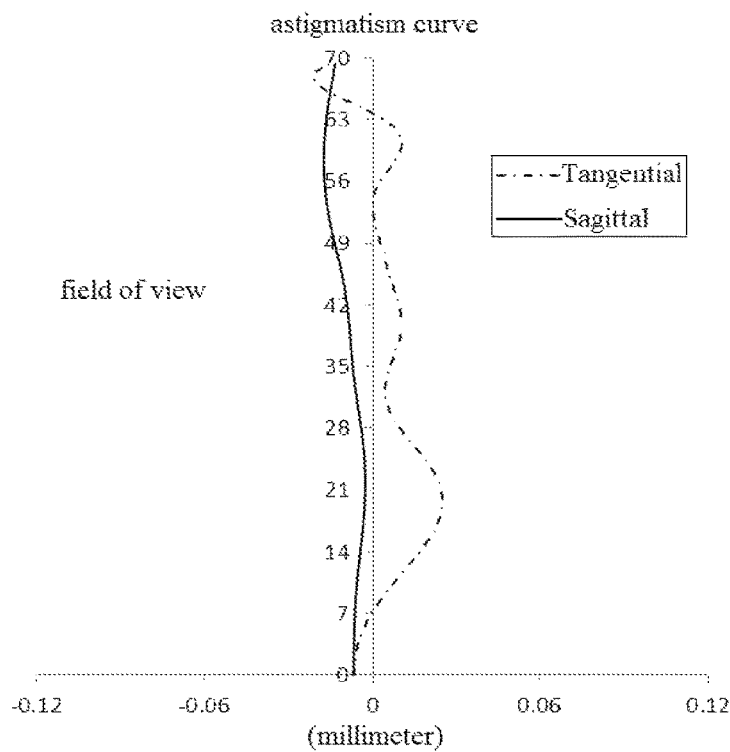
Figure 4D:
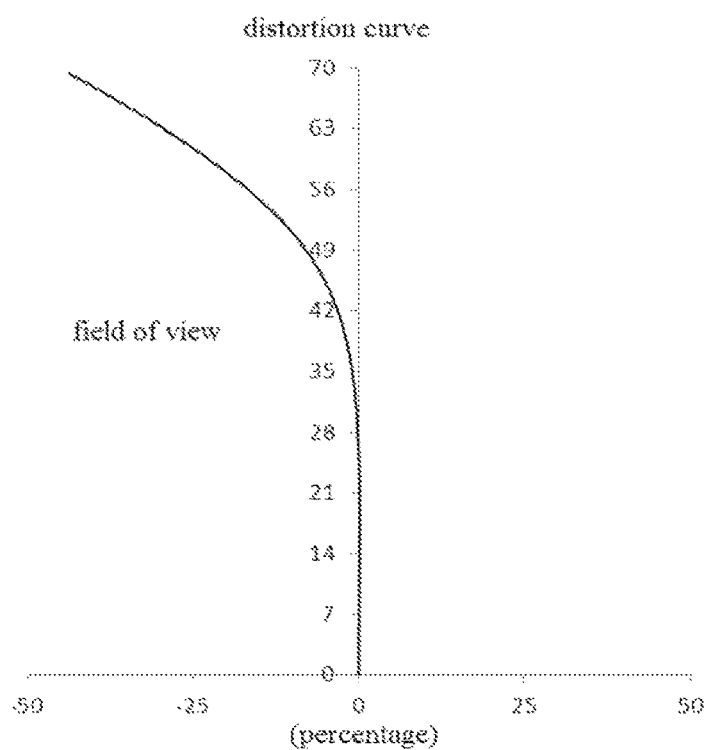

FIG. 4A shows a longitudinal aberration curve of the optical imaging lens assembly according to the Embodiment 2 to represent deviation of a convergence focal point after light with different wavelengths passes through the optical system. FIG. 4B shows a lateral color curve of the optical imaging lens assembly according to the Embodiment 2 to represent deviation of different image heights on the imaging surface after the light passes through the optical system. FIG. 4C shows an astigmatism curve of the optical imaging lens assembly according to the Embodiment 2 to represent a tangential image surface curvature and a sagittal image surface curvature. FIG. 4D shows a distortion curve of the optical imaging lens assembly according to the Embodiment 2 to represent distortion values corresponding to different E2 has a positive refractive power, an object-side surface S3 thereof is a concave surface, while an image-side surface S4 is a convex surface. The third lens E3 has a positive refractive power, an object-side surface S5 thereof is a convex surface, while an image-side surface S6 is a convex surface. The fourth lens E4 has a negative refractive power, an object-side surface S7 thereof is a convex surface, while an image-side surface S8 is a concave surface. The optical filter E5 has an object-side surface S9 and an image-side surface S10. The optical imaging lens assembly of the Embodiment 3 has an imaging surface S11. Light from an object sequentially penetrates through each surface (S1 to S10) and is finally imaged on the imaging surface S11.

Table 5 shows a table of basic parameters for the optical imaging lens assembly of the embodiment, and units of the curvature radius, the thickness and the focal length are all millimeter (mm). Table 6 shows higher-order coefficients that can be used for each aspheric surface of the optical imaging lens assembly of the Embodiment 3. A surface type of each aspheric surface may be defined through formula (1), specifically as follows.

TABLE 5

TTL = 3.75 mm, ImgH = 1.95 mm, Semi-FOV = 55.5°, and f = 1.56 mm

| Surface number | Surface type | Curvature radius | Thickness/distance | Material Refractive index | Abbe number | Focal length | Conic coefficient |
|---|---|---|---|---|---|---|---|
| OBJ | Spherical | Infinite | Infinite | | | | |
| S1 | Aspherical | −14.3474 | 0.3635 | 1.54 | 55.9 | −14.02 | 0.0000 |
| S2 | Aspherical | 15.9618 | 0.5260 | | | | 0.0000 |
| STO | Spherical | Infinite | 0.0611 | | | | 0.0000 |
| S3 | Aspherical | −89.3230 | 0.4904 | 1.55 | 56.1 | 3.93 | 0.0000 |
| S4 | Aspherical | −2.0986 | 0.2774 | | | | 7.2761 |
| S5 | Aspherical | 3.4660 | 0.6700 | 1.55 | 56.1 | 1.42 | −13.7743 |
| S6 | Aspherical | −0.9269 | 0.0200 | | | | −1.0000 |
| S7 | Aspherical | 1.5788 | 0.3956 | 1.67 | 20.4 | −1.88 | 0.0000 |
| S8 | Aspherical | 0.6280 | 0.2603 | | | | −1.6320 |
| S9 | Spherical | Infinite | 0.2100 | 1.52 | 64.2 | | |
| S10 | Spherical | Infinite | 0.4758 | | | | |
| S11 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S1 | 4.1192E−01 | −5.3758E−01 | 1.0283E+00 | −1.5362E+00 | 1.6925E+00 | −1.2878E+00 | 6.3674E−01 | −1.5355E−01 | 0.0000E+00 |
| S2 | 7.8928E−01 | −2.9304E+00 | 1.7245E+01 | −6.6615E+01 | 1.5567E+02 | −2.0800E+02 | 1.4400E+02 | −3.9965E+01 | 0.0000E+00 |
| S3 | −5.1370E−01 | 2.7980E+00 | −7.4991E+01 | 7.4294E+02 | −3.7968E+03 | 7.4452E+03 | 0.0000E+00 | 0.0000E+00 | 0.0000E+00 |
| S4 | −1.9370E−01 | −5.7271E+00 | 7.3290E+01 | −6.3524E+02 | 3.5179E+03 | −1.2566E+04 | 2.7870E+04 | −3.4871E+04 | 1.8733E+04 |
| S5 | 3.9905E−01 | −2.4635E+00 | 1.2078E+01 | −4.2185E+01 | 9.3083E+01 | −1.2504E+02 | 9.3921E+01 | −3.2958E+01 | 3.0751E+00 |
| S6 | 1.1624E+00 | −5.8005E+00 | 2.1902E+01 | −4.9868E+01 | 6.5754E+01 | −4.5221E+01 | 8.0043E+00 | 7.3309E+00 | −3.1280E+00 |
| S7 | −1.6978E−01 | −4.6862E+00 | 2.0467E+01 | −5.0846E+01 | 7.6778E+01 | −6.9281E+01 | 3.4097E+01 | −6.9909E+00 | 0.0000E+00 |
| S8 | −1.1833E+00 | 2.1614E+00 | −3.0419E+00 | 3.0042E+00 | −1.9902E+00 | 8.3823E−01 | −2.0493E−01 | 2.3778E−02 | −6.2000E−04 |

Figure 6A:
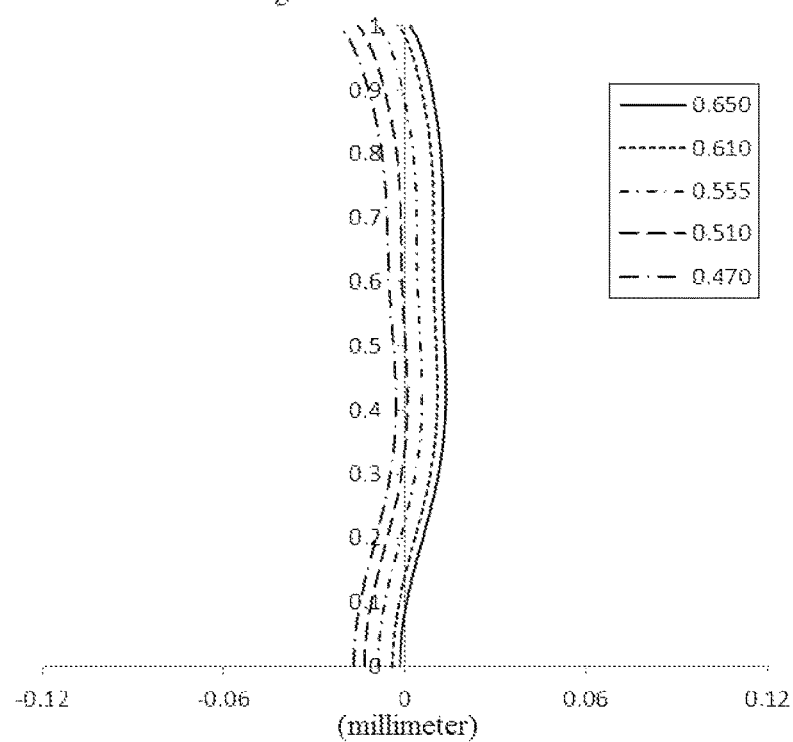
FIGS. 6A-6D sequentially show a longitudinal aberration curve, a lateral color curve, an astigmatism curve and a distortion curve of an optical imaging lens assembly according to Embodiment 3 of the disclosure.
Figure 6B:
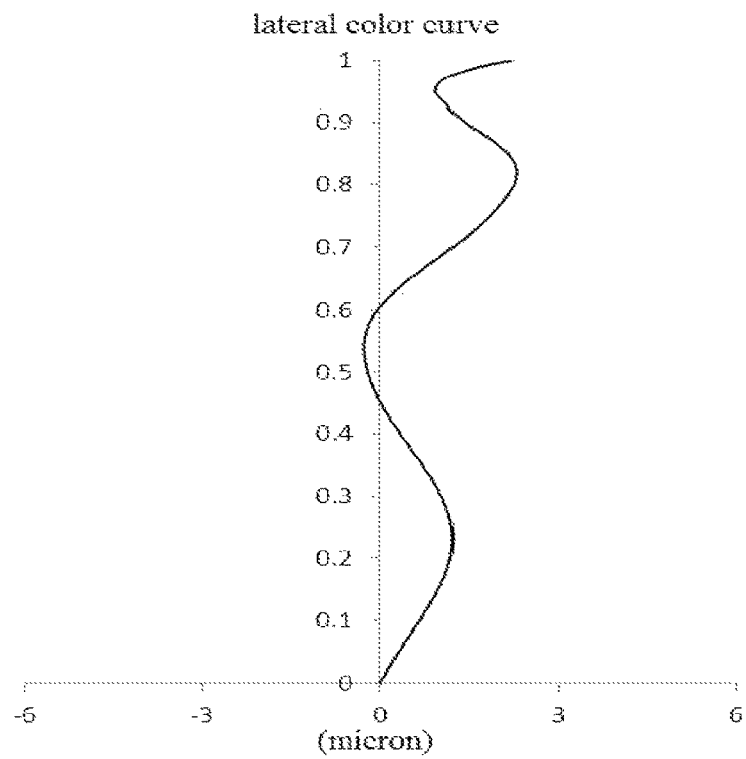
Figure 6C:
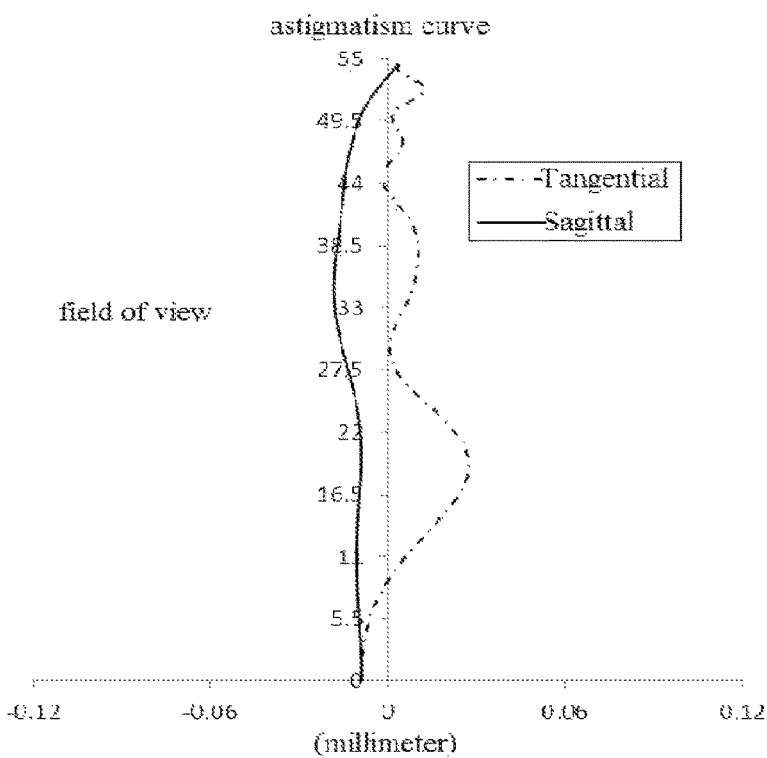
Figure 6D:
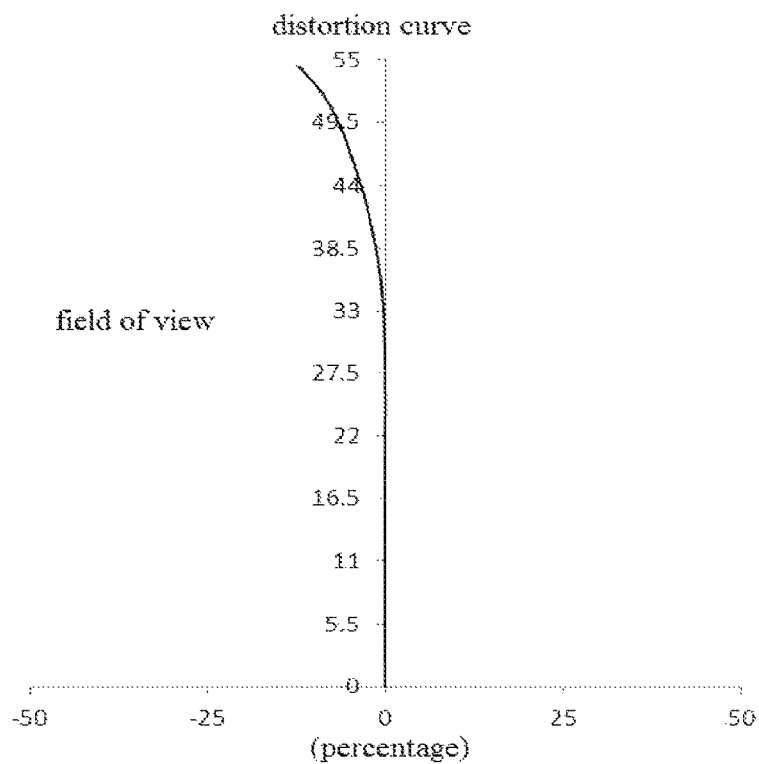

FIG. 6A shows a longitudinal aberration curve of the optical imaging lens assembly according to the Embodiment 3 to represent deviation of a convergence focal point after light with different wavelengths passes through the optical system. FIG. 6B shows a lateral color curve of the optical imaging lens assembly according to the Embodiment 3 to represent deviation of different image heights on the imaging surface after the light passes through the optical system. FIG. 6C shows an astigmatism curve of the optical imaging lens assembly according to the Embodiment 3 to represent a tangential image surface curvature and a sagittal image surface curvature. FIG. 6D shows a distortion curve of the optical imaging lens assembly according to the Embodiment 3 to represent distortion values corresponding to different fields of view (FOV). According to FIGS. 6A-6D, it can be seen that the optical imaging lens assembly provided in the Embodiment 3 may achieve high imaging quality.

Embodiment 4

Figure 7:
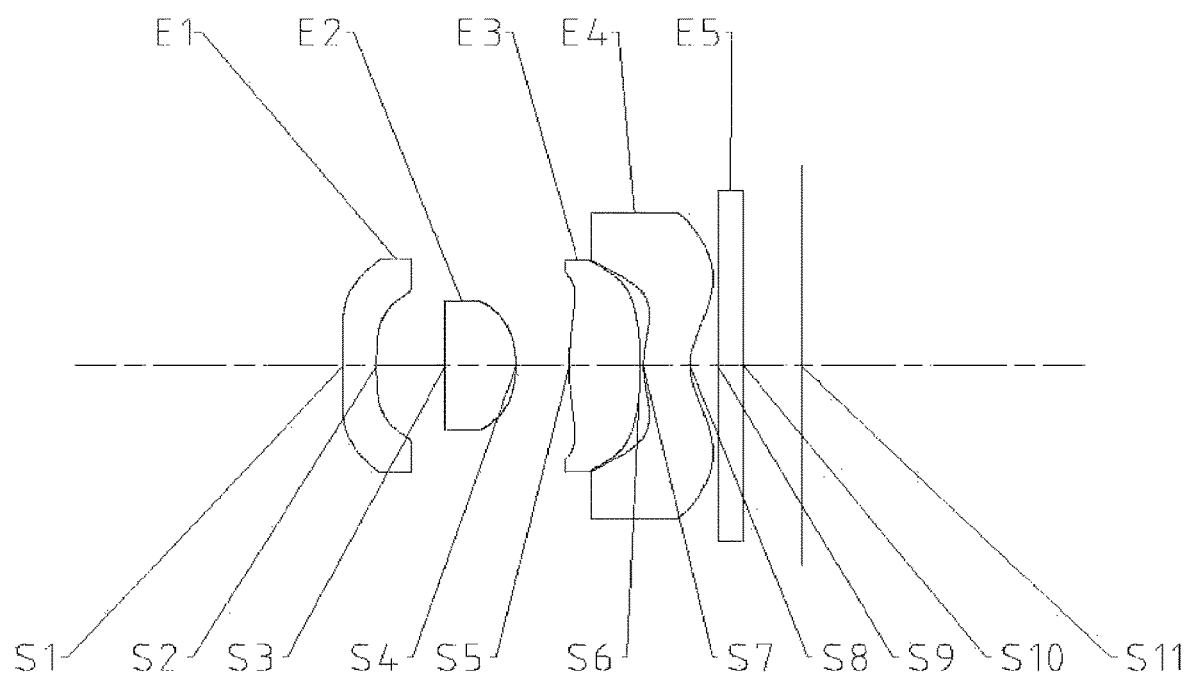
FIG. 7 shows a schematic structure diagram of an optical imaging lens assembly according to Embodiment 4 of the disclosure.

An optical imaging lens assembly according to Embodiment 4 of the disclosure will be described below with reference to FIGS. 7-8D. Referring to FIG. 7, an optical imaging lens assembly of the Embodiment 4 sequentially includes, from an object side to an image side along an optical axis, a first lens E1, a second lens E2, a third lens E3, a fourth lens E4, and an optical filter E5. A diaphragm STO (not shown) may be arranged between the first lens E1 and the second lens E2. There may be an air space between any two adjacent lenses.

The first lens E1 has a negative refractive power, an object-side surface S1 thereof is a concave surface, while an image-side surface S2 is a concave surface. The second lens E2 has a positive refractive power, an object-side surface S3 thereof is a convex surface, while an image-side surface S4 is a convex surface. The third lens E3 has a positive refractive power, an object-side surface S5 thereof is a convex surface, while an image-side surface S6 is a convex surface. The fourth lens E4 has a negative refractive power, an object-side surface S7 thereof is a convex surface, while an image-side surface S8 is a concave surface. The optical filter E5 has an object-side surface S9 and an image-side surface S10. The optical imaging lens assembly of the Embodiment 4 has an imaging surface S11. Light from an object sequentially penetrates through each surface (S1 to S10) and is finally imaged on the imaging surface S11.

Table 7 shows a table of basic parameters for the optical imaging lens assembly of the Embodiment 4, and units of the curvature radius, the thickness and the focal length are all millimeter (mm). Table 8 shows higher-order coefficients that can be used for each aspheric surface of the optical imaging lens assembly of the Embodiment 4. A surface type of each aspheric surface may be defined through formula (1), specifically as follows.

TABLE 7

TTL = 3.70 mm, ImgH = 1.95 mm, Semi-FOV = 60.0°, and f = 1.57 mm

| Surface number | Surface type | Curvature radius | Thickness/distance | Material Refractive index | Abbe number | Focal length | Conic coefficient |
|---|---|---|---|---|---|---|---|
| OBJ | Spherical | Infinite | Infinite | | | | |
| S1 | Aspherical | −4.0417 | 0.2701 | 1.54 | 55.9 | −5.38 | 0.0000 |
| S2 | Aspherical | 10.3603 | 0.5333 | | | | 0.0000 |
| STO | Spherical | Infinite | 0.0200 | | | | 0.0000 |
| S3 | Aspherical | 9.3779 | 0.5711 | 1.55 | 56.1 | 1.94 | 0.0000 |
| S4 | Aspherical | −1.1652 | 0.4303 | | | | −2.7344 |
| S5 | Aspherical | 4.4795 | 0.5796 | 1.55 | 56.1 | 4.00 | −88.9122 |
| S6 | Aspherical | −4.0662 | 0.0200 | | | | 0.0000 |
| S7 | Aspherical | 1.1129 | 0.3773 | 1.67 | 20.4 | −5.09 | 0.0000 |
| S8 | Aspherical | 0.7245 | 0.2239 | | | | −1.5798 |
| S9 | Spherical | Infinite | 0.2100 | 1.52 | 64.2 | | |
| S10 | Spherical | Infinite | 0.4644 | | | | |
| S11 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S1 | 7.0971E−01 | −7.8601E−01 | 1.3237E−01 | 2.8375E+00 | −6.9478E+00 | 7.9525E+00 | −4.4991E+00 | 9.8274E−01 | 0.0000E+00 |
| S2 | 9.0083E−01 | 2.7104E+00 | −4.3116E+01 | 3.0039E+02 | −1.1754E+03 | 2.6562E+03 | −3.1744E+03 | 1.5288E+03 | 0.0000E+00 |
| S3 | −4.0045E−01 | 1.3044E+00 | −3.7232E+01 | 2.9888E+02 | −1.2414E+03 | 1.7687E+03 | 0.0000E+00 | 0.0000E+00 | 0.0000E+00 |
| S4 | −2.5768E−01 | −1.0348E+01 | 1.6444E+02 | −1.6028E+03 | 9.6746E+03 | −3.6626E+04 | 8.4339E+04 | −1.0786E+05 | 5.8564E+04 |
| S5 | 2.0637E−01 | 6.8288E−01 | −1.3568E+01 | 7.5084E+01 | −2.3156E+02 | 4.2740E+02 | −4.6858E+02 | 2.7989E+02 | −6.9694E+01 |
| S6 | −6.6229E−01 | 6.6184E+00 | −3.8350E+01 | 1.2902E+02 | −2.6736E+02 | 3.4490E+02 | −2.7093E+02 | 1.1869E+02 | −2.2177E+01 |
| S7 | −1.4824E+00 | 4.5083E+00 | −2.2865E+01 | 6.6190E+01 | −1.1011E+02 | 1.0327E+02 | −5.0455E+01 | 9.9459E+00 | 0.0000E+00 |
| S8 | −8.1060E−01 | 5.8821E−01 | 1.4579E−01 | −8.6506E−01 | 9.3868E−01 | −5.4309E−01 | 1.8676E−01 | −3.6650E−02 | 3.1940E−03 |

Figure 8A:
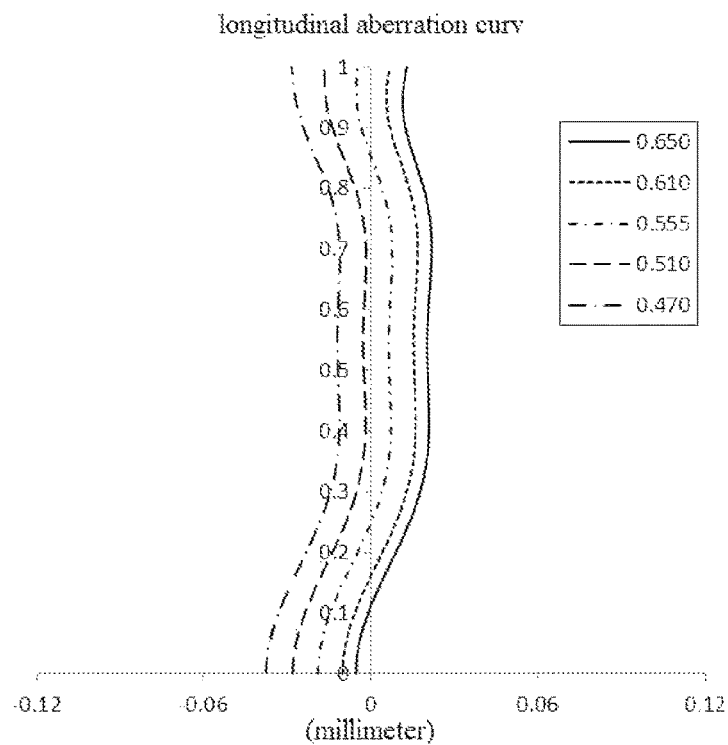
FIGS. 8A-8D sequentially show a longitudinal aberration curve, a lateral color curve, an astigmatism curve and a distortion curve of an optical imaging lens assembly according to Embodiment 4 of the disclosure.
Figure 8B:
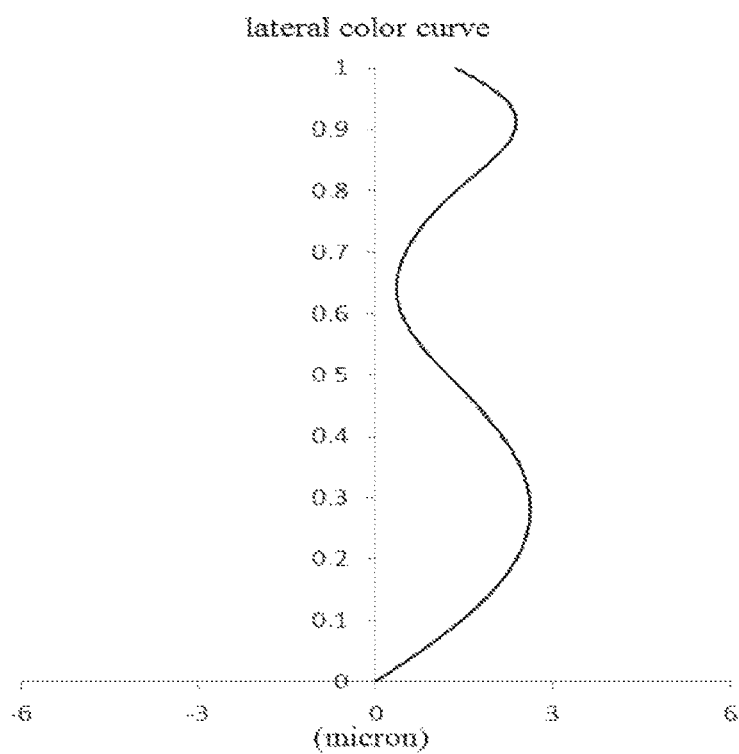
Figure 8C:
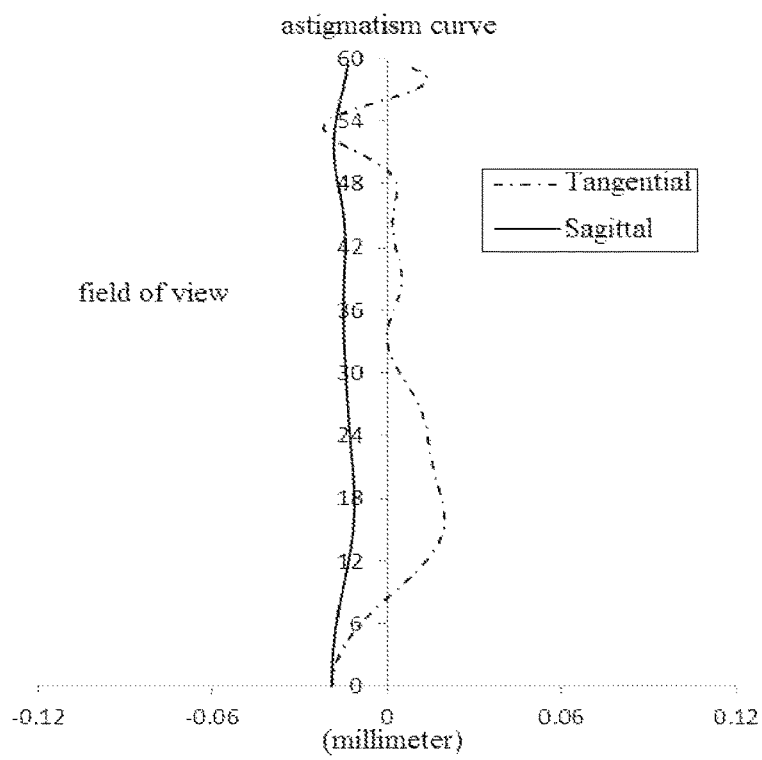
Figure 8D:
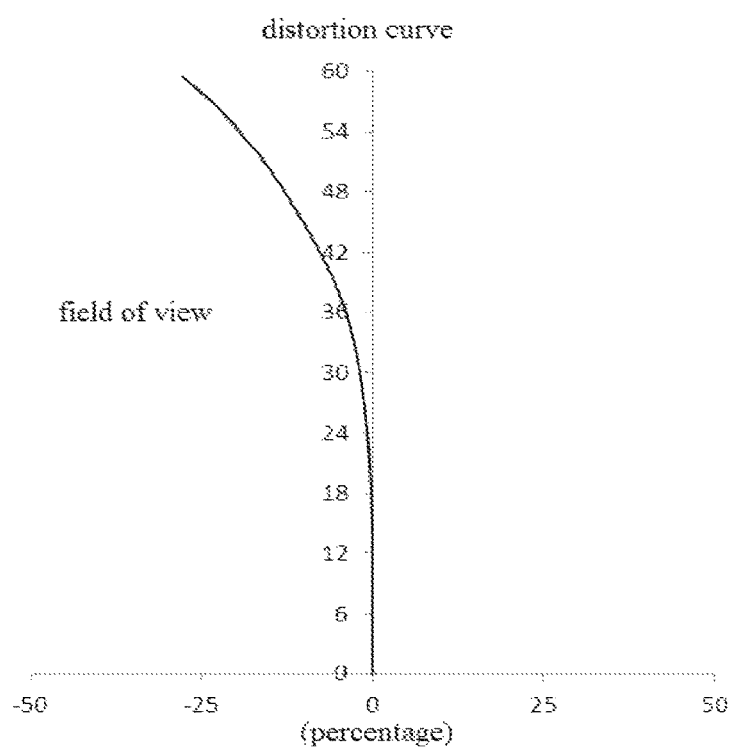

FIG. 8A shows a longitudinal aberration curve of the optical imaging lens assembly according to the Embodiment 4 to represent deviation of a convergence focal point after light with different wavelengths passes through the optical system. FIG. 8B shows a lateral color curve of the optical imaging lens assembly according to the Embodiment 4 to represent deviation of different image heights on the imaging surface after the light passes through the optical system. FIG. 8C shows an astigmatism curve of the optical imaging lens assembly according to the Embodiment 4 to represent a tangential image surface curvature and a sagittal image surface curvature. FIG. 8D shows a distortion curve of the optical imaging lens assembly according to the Embodiment 4 to represent distortion values corresponding to different fields of view (FOV). According to FIGS. 8A-8D, it can be seen that the optical imaging lens assembly provided in the Embodiment 4 may achieve high imaging quality.

Embodiment 5

Figure 9:
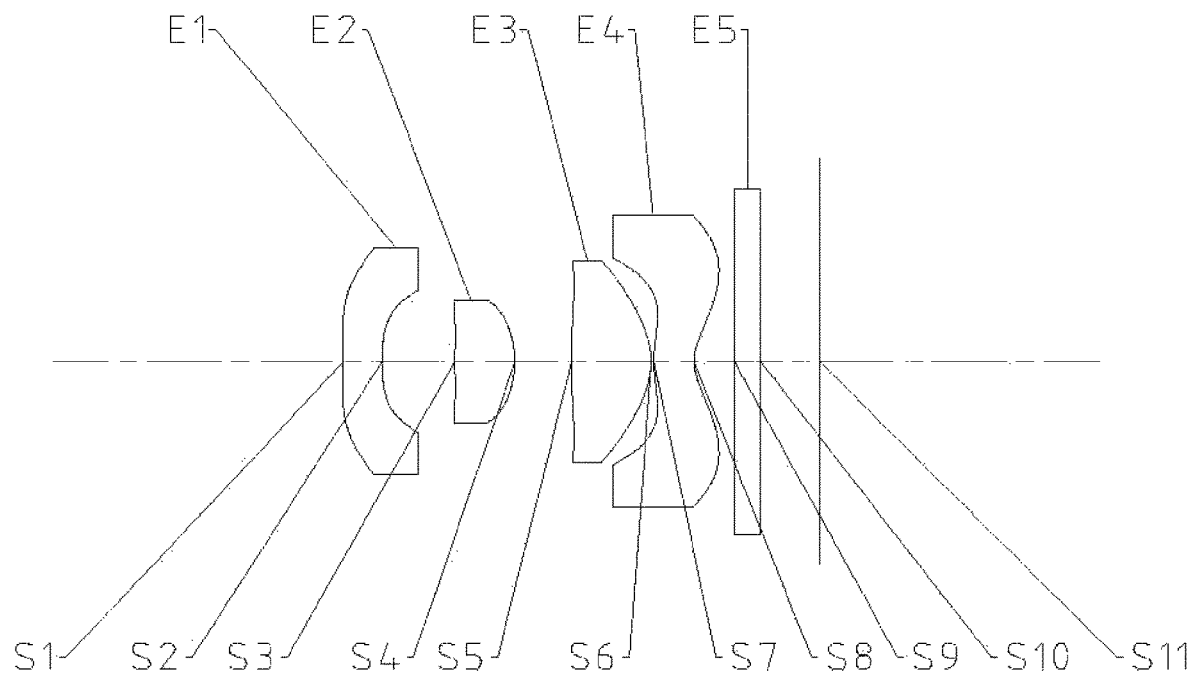
FIG. 9 shows a schematic structure diagram of an optical imaging lens assembly according to Embodiment 5 of the disclosure.

An optical imaging lens assembly according to Embodiment 5 of the disclosure will be described below with reference to FIGS. 9-10D. Referring to FIG. 9, an optical imaging lens assembly of the Embodiment 5 sequentially includes, from an object side to an image side along an optical axis, a first lens E1, a second lens E2, a third lens E3, a fourth lens E4, and an optical filter E5. A diaphragm STO (not shown) may be arranged between the first lens E1 and the second lens E2. There may be an air space between any two adjacent lenses.

The first lens E1 has a negative refractive power, an object-side surface S1 thereof is a concave surface, while an image-side surface S2 is a concave surface. The second lens E2 has a positive refractive power, an object-side surface S3 thereof is a convex surface, while an image-side surface S4 is a convex surface. The third lens E3 has a positive refractive power, an object-side surface S5 thereof is a convex surface, while an image-side surface S6 is a convex surface. The fourth lens E4 has a negative refractive power, an object-side surface S7 thereof is a convex surface, while an image-side surface S8 is a concave surface. The optical filter E5 has an object-side surface S9 and an image-side surface S10. The optical imaging lens assembly of the Embodiment 5 has an imaging surface S11. Light from an object sequentially penetrates through each surface (S1 to S10) and is finally imaged on the imaging surface S11.

Table 9 shows a table of basic parameters for the optical imaging lens assembly of the Embodiment 5, and units of the curvature radius, the thickness and the focal length are all millimeter (mm). Table 10 shows higher-order coefficients that can be used for each aspheric surface of the optical imaging lens assembly of the Embodiment 5. A surface type of each aspheric surface may be defined through formula (1), specifically as follows.

TABLE 9

TTL = 3.82 mm, ImgH = 1.95 mm, Semi-FOV = 65.6°, and f = 1.46 mm

| Surface number | Surface type | Curvature radius | Thickness/distance | Material Refractive index | Abbe number | Focal length | Conic coefficient |
|---|---|---|---|---|---|---|---|
| OBJ | Spherical | Infinite | Infinite | | | | |
| S1 | Aspherical | −4.3947 | 0.3091 | 1.55 | 56.1 | −3.58 | 2.0514 |
| S2 | Aspherical | 3.6015 | 0.5600 | | | | 21.0453 |
| STO | Spherical | Infinite | 0.0200 | | | | 0.0000 |
| S3 | Aspherical | 6.5102 | 0.4831 | 1.55 | 56.1 | 1.91 | 68.5029 |
| S4 | Aspherical | −1.2067 | 0.4550 | | | | 2.4741 |
| S5 | Aspherical | 58.3133 | 0.6427 | 1.55 | 56.1 | 1.48 | −99.0000 |
| S6 | Aspherical | −0.8166 | 0.0200 | | | | −0.7176 |
| S7 | Aspherical | 1.5099 | 0.3220 | 1.67 | 20.4 | −1.66 | −1.0650 |
| S8 | Aspherical | 0.5837 | 0.3224 | | | | −4.1829 |
| S9 | Spherical | Infinite | 0.2100 | 1.52 | 64.2 | | |
| S10 | Spherical | Infinite | 0.4758 | | | | |
| S11 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1 | 7.6105E−01 | −1.4465E+00 | 3.2159E+00 | −6.4747E+00 | 1.0283E+01 | −1.1513E+01 | 8.2680E+00 | −3.3819E+00 | 5.9440E−01 |
| S2 | 1.3598E+00 | −8.1958E+00 | 1.0000E+02 | −8.2401E+02 | 4.2794E+03 | −1.3805E+04 | 2.6861E+04 | −2.8785E+04 | 1.2973E+04 |
| S3 | −8.7647E−01 | 3.7612E+01 | −1.3709E+03 | 2.8700E+04 | −3.7020E+05 | 2.9725E+06 | −1.4465E+07 | 3.9013E+07 | −4.4721E+07 |
| S4 | −4.6580E−02 | −2.2344E−01 | 0.0000E+00 | 0.0000E+00 | 0.0000E+00 | 0.0000E+00 | 0.0000E+00 | 0.0000E+00 | 0.0000E+00 |
| S5 | 1.9933E−01 | −2.0023E−01 | −3.0523E+00 | 2.1470E+01 | −7.2958E+01 | 1.4508E+02 | −1.7225E+02 | 1.1302E+02 | −3.1430E+01 |
| S6 | 6.7295E−01 | 2.1172E−01 | −1.3262E+01 | 7.0407E+01 | −1.9181E+02 | 3.0832E+02 | −2.9501E+02 | 1.5536E+02 | −3.4614E+01 |
| S7 | −1.1126E+00 | 3.2100E+00 | −2.0433E+01 | 8.0615E+01 | −1.9022E+02 | 2.7504E+02 | −2.4037E+02 | 1.1692E+02 | −2.4304E+01 |
| S8 | −3.3316E−01 | −2.0954E−01 | 1.5146E+00 | −2.9251E+00 | 3.1431E+00 | −2.0674E+00 | 8.2555E−01 | −1.8348E−01 | 1.7381E−02 |

Figure 10A:
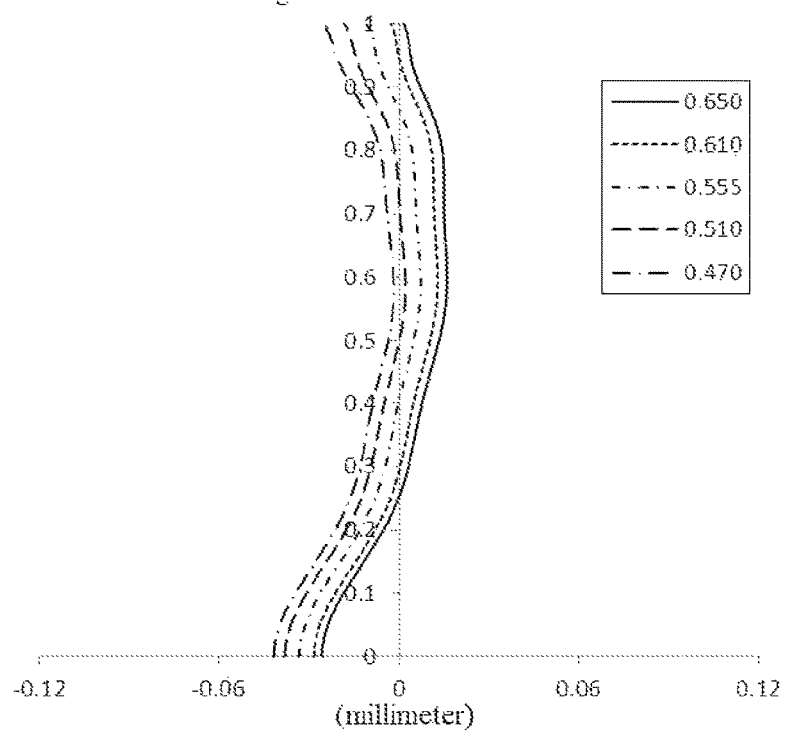
FIGS. 10A-10D sequentially show a longitudinal aberration curve, a lateral color curve, an astigmatism curve and a distortion curve of an optical imaging lens assembly according to Embodiment 5 of the disclosure.
Figure 10B:
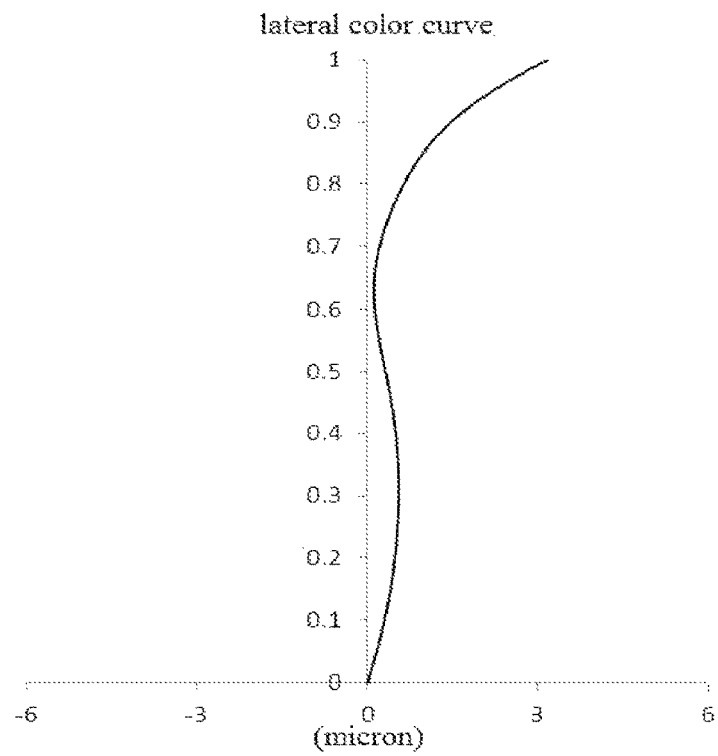
Figure 10C:
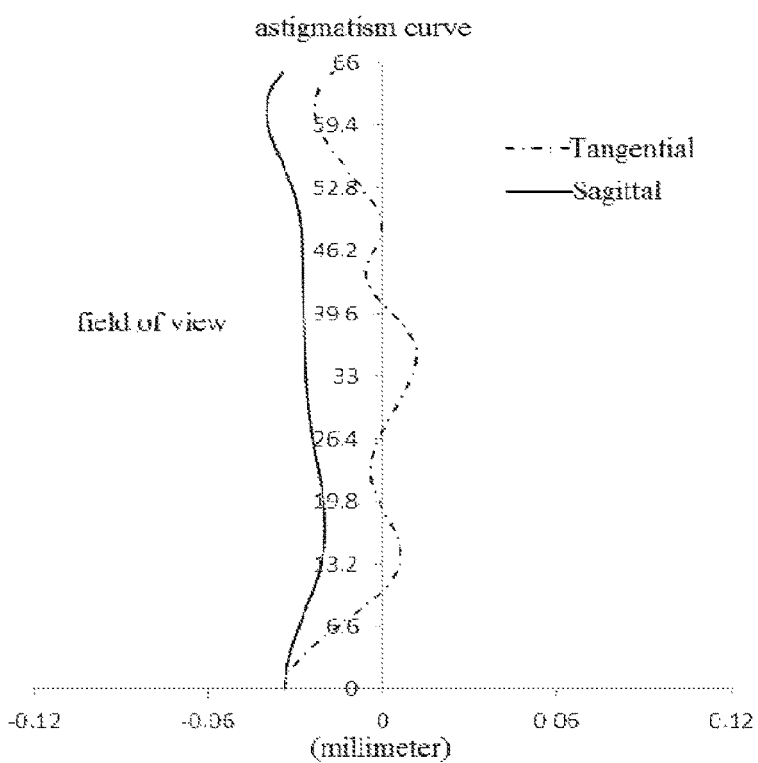
Figure 10D:
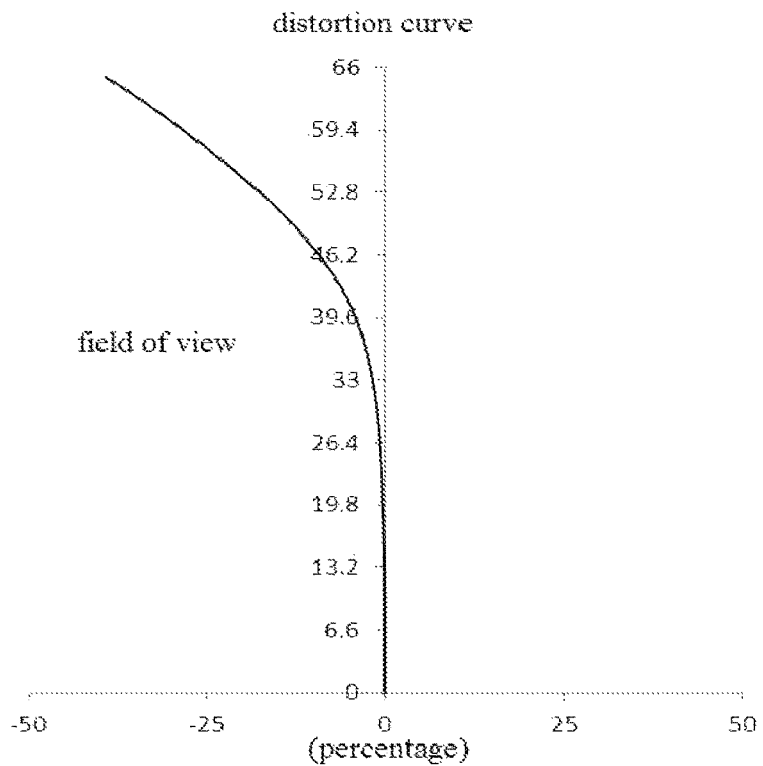

FIG. 10A shows a longitudinal aberration curve of the optical imaging lens assembly according to the Embodiment 5 to represent deviation of a convergence focal point after light with different wavelengths passes through the optical system. FIG. 10B shows a lateral color curve of the optical imaging lens assembly according to the Embodiment 5 to represent deviation of different image heights on the imaging surface after the light passes through the optical system. FIG. 10C shows an astigmatism curve of the optical imaging lens assembly according to the Embodiment 5 to represent a tangential image surface curvature and a sagittal image surface curvature. FIG. 10D shows a distortion curve of the optical imaging lens assembly according to the Embodiment 5 to represent distortion values corresponding to different fields of view (FOV). According to FIGS. 10A-10D, it can be seen that the optical imaging lens assembly provided in the Embodiment 5 may achieve high imaging quality.

Embodiment 6

Figure 11:
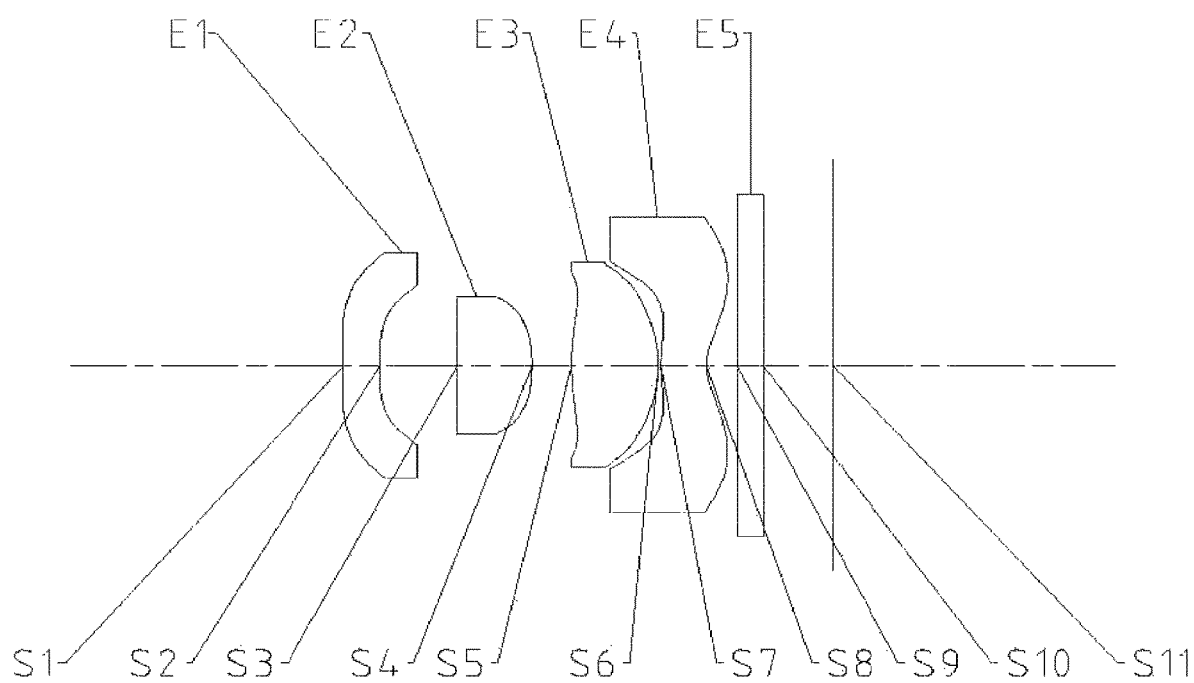
FIG. 11 shows a schematic structure diagram of an optical imaging lens assembly according to Embodiment 6 of the disclosure.

An optical imaging lens assembly according to Embodiment 6 of the disclosure will be described below with reference to FIGS. 11-12D. Referring to FIG. 11, an optical imaging lens assembly of the Embodiment 6 sequentially includes, from an object side to an image side along an optical axis, a first lens E1, a second lens E2, a third lens E3, a fourth lens E4, and an optical filter E5. A diaphragm STO (not shown) may be arranged between the first lens E1 and the second lens E2. There may be an air space between any two adjacent lenses.

The first lens E1 has a negative refractive power, an object-side surface S1 thereof is a concave surface, while an image-side surface S2 is a concave surface. The second lens E2 has a positive refractive power, an object-side surface S3 thereof is a convex surface, while an image-side surface S4 is a convex surface. The third lens E3 has a positive refractive power, an object-side surface S5 thereof is a convex surface, while an image-side surface S6 is a convex surface. The fourth lens E4 has a negative refractive power, an object-side surface S7 thereof is a convex surface, while an image-side surface S8 is a concave surface. The optical filter E5 has an object-side surface S9 and an image-side surface S10. The optical imaging lens assembly of the Embodiment 6 has an imaging surface S11. Light from an object sequentially penetrates through each surface (S1 to S10) and is finally imaged on the imaging surface S11.

Table 11 shows a table of basic parameters for the optical imaging lens assembly of the Embodiment 6, and units of the curvature radius, the thickness and the focal length are all millimeter (mm). Table 12 shows higher-order coefficients that can be used for each aspheric surface of the optical imaging lens assembly of the Embodiment 6. A surface type of each aspheric surface may be defined through formula (1), specifically as follows.

TABLE 11

TTL = 3.92 mm, ImgH = 1.95 mm, Semi-FOV = 57.6°, and f = 1.59 mm

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Aspherical | −5.2035 | 0.2904 | 1.54 | 55.9 | −5.26 | 0.0000 |
| S2 | Aspherical | 6.3029 | 0.5900 | | | | 0.0000 |
| STO | Spherical | Infinite | 0.0298 | | | | 0.0000 |
| S3 | Aspherical | 6.8930 | 0.5995 | 1.55 | 56.1 | 2.48 | 68.2643 |
| S4 | Aspherical | −1.6340 | 0.3126 | | | | −2.4671 |
| S5 | Aspherical | 3.0665 | 0.7000 | 1.55 | 56.1 | 1.70 | −51.1352 |
| S6 | Aspherical | −1.2224 | 0.0200 | | | | 0.0000 |
| S7 | Aspherical | 1.6727 | 0.3655 | 1.67 | 20.4 | −1.95 | 0.0000 |
| S8 | Aspherical | 0.6671 | 0.2446 | | | | −1.3778 |
| S9 | Spherical | Infinite | 0.2100 | 1.52 | 64.2 | | |
| S10 | Spherical | Infinite | 0.5576 | | | | |
| S11 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S1 | 7.5182E−01 | −1.3706E+00 | 2.9201E+00 | −4.9991E+00 | 6.3416E+00 | −5.5223E+00 | 3.0867E+00 | −9.8229E−01 | 1.2626E−01 |
| S2 | 1.1665E+00 | −3.3413E+00 | 2.1986E+01 | −1.2081E+02 | 4.7480E+02 | −1.2314E+03 | 2.0135E+03 | −1.8795E+03 | 7.5228E+02 |
| S3 | −2.3375E−01 | −5.0148E+00 | 3.3382E+01 | 1.4166E+02 | −2.5571E+03 | 7.0896E+03 | 0.0000E+00 | 0.0000E+00 | 0.0000E+00 |
| S4 | −3.2413E−01 | −6.2712E+00 | 8.6527E+01 | −7.6050E+02 | 4.1724E+03 | −1.4450E+04 | 3.0562E+04 | −3.5989E+04 | 1.8023E+04 |
| S5 | 3.6267E−01 | −1.5917E+00 | 1.8192E+00 | 1.3405E+01 | −8.3560E+01 | 2.1880E+02 | −3.1143E+02 | 2.3271E+02 | −7.0795E+01 |
| S6 | 4.7999E−01 | −1.1855E+00 | −2.5057E+00 | 3.2219E+01 | −1.0836E+02 | 1.8656E+02 | −1.8017E+02 | 9.2697E+01 | −1.9656E+01 |
| S7 | −8.9463E−01 | −1.0305E+00 | 2.7463E+00 | 3.9283E+00 | −2.2236E+00 | 3.1532E+01 | −1.9131E+01 | 4.3452E+00 | 0.0000E+00 |
| S8 | −1.4165E+00 | 2.3824E+00 | −3.0347E+00 | 2.8181E+00 | −1.8795E+00 | 8.6528E−01 | −2.5578E−01 | 4.2900E−02 | −3.0500E−03 |

Figure 12A:
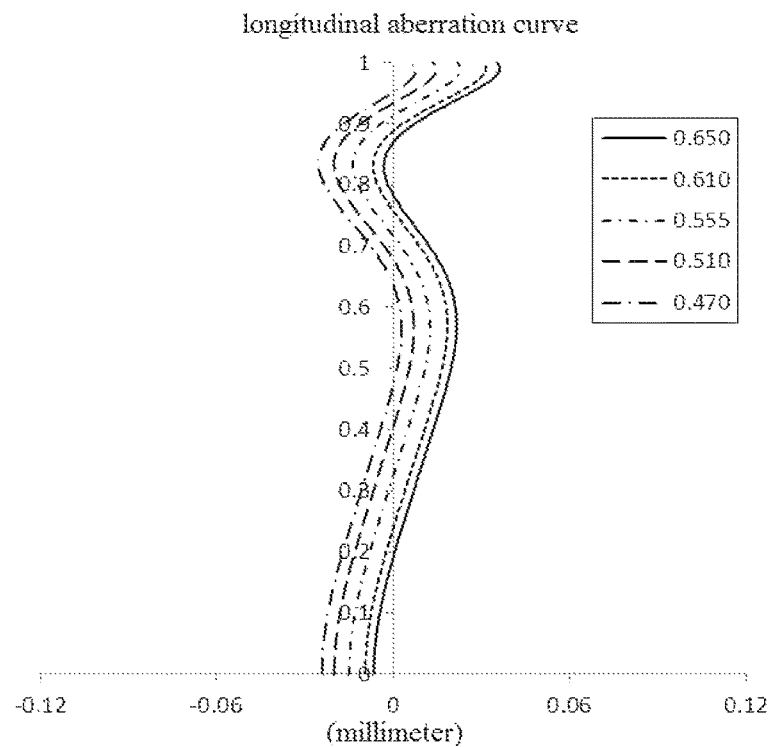
FIGS. 12A-12D sequentially show a longitudinal aberration curve, a lateral color curve, an astigmatism curve and a distortion curve of an optical imaging lens assembly according to Embodiment 6 of the disclosure.
Figure 12B:
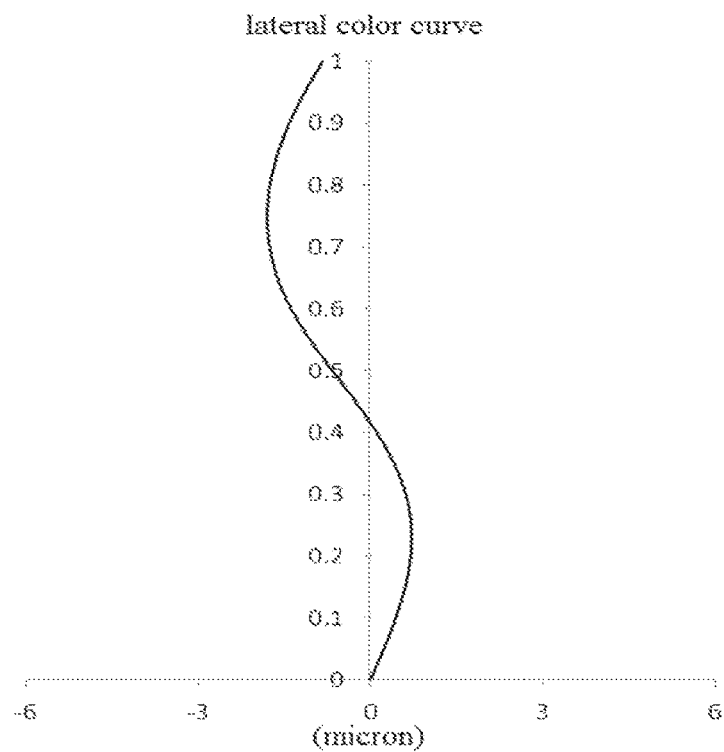
Figure 12C:
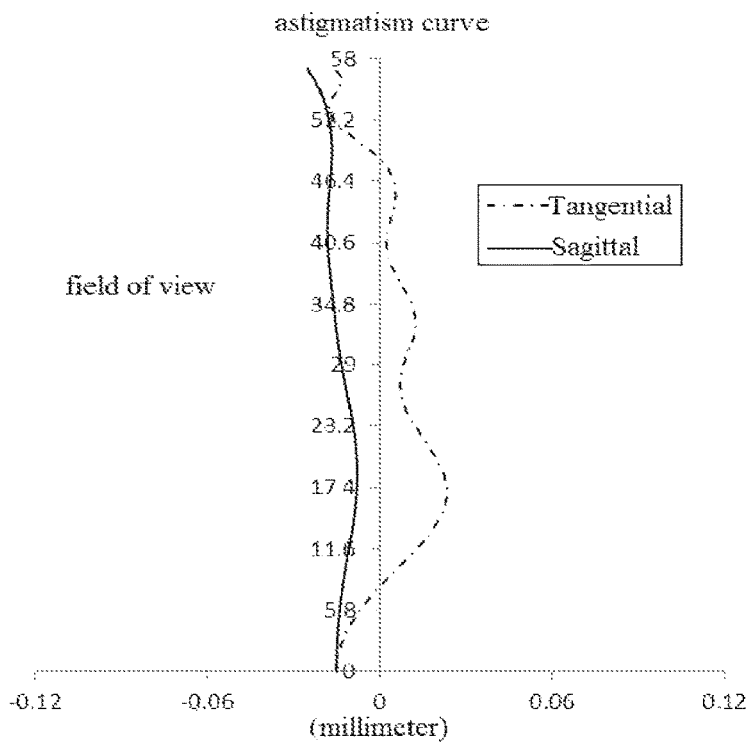
Figure 12D:
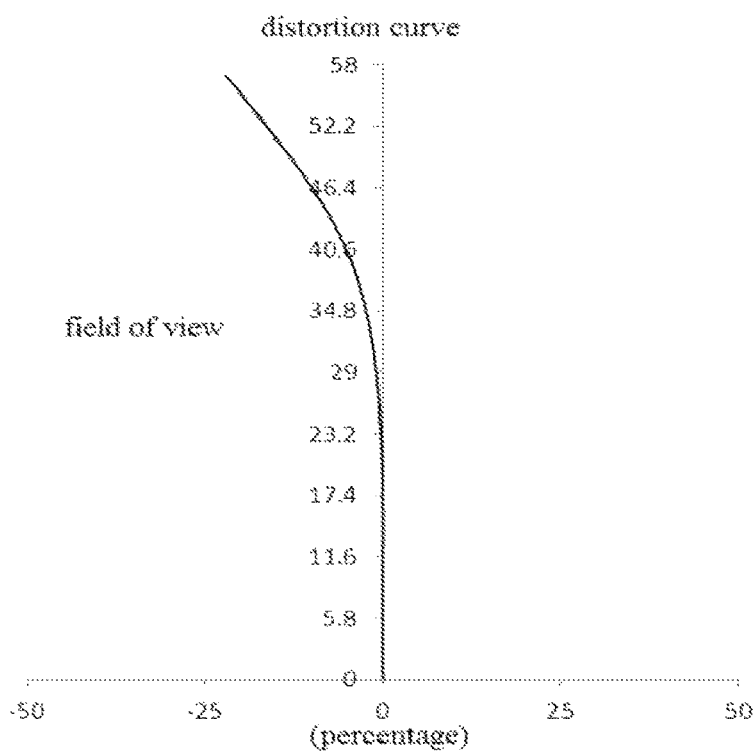

FIG. 12A shows a longitudinal aberration curve of the optical imaging lens assembly according to the Embodiment 6 to represent deviation of a convergence focal point after light with different wavelengths passes through the optical system. FIG. 12B shows a lateral color curve of the optical imaging lens assembly according to the Embodiment 6 to represent deviation of different image heights on the imaging surface after the light passes through the optical system. FIG. 12C shows an astigmatism curve of the optical imaging lens assembly according to the Embodiment 6 to represent a tangential image surface curvature and a sagittal image surface curvature. FIG. 12D shows a distortion curve of the optical imaging lens assembly according to the Embodiment 6 to represent distortion values corresponding to different fields of view (FOV). According to FIGS. 12A-12D, it can be seen that the optical imaging lens assembly provided in the Embodiment 6 may achieve high imaging quality.

From the above, Embodiment 1 to Embodiment 6 satisfy a relationship shown in Table 13 respectively.

TABLE 13

| Conditional expression | embodiment 1 | 2 | 3 | 4 | 5 | 6 |
|---|---|---|---|---|---|---|
| Semi-FOV(°) | 61.5 | 70.0 | 55.0 | 60.0 | 65.6 | 57.6 |
| f4/f1 | 0.66 | 0.46 | 0.13 | 0.95 | 0.46 | 0.37 |
| (f2 + f3)/f | 3.16 | 2.72 | 3.42 | 3.79 | 2.32 | 2.63 |
| R4/R6 | 1.85 | 1.53 | 2.26 | 0.29 | 1.48 | 1.34 |
| R7/R8 | 2.09 | 2.69 | 2.51 | 1.54 | 2.59 | 2.51 |
| (CT2 + CT3)/TTL × 5 | 1.82 | 1.71 | 1.55 | 1.56 | 1.47 | 1.66 |
| (T12 + T23)/ImgH | 0.45 | 0.46 | 0.44 | 0.50 | 0.53 | 0.48 |
| (DT22 + DT32)/DT42 | 1.16 | 1.10 | 1.12 | 1.11 | 1.11 | 1.16 |
| (DT11 + DT12)/ImgH | 1.02 | 1.01 | 1.04 | 0.92 | 0.91 | 0.95 |
| f2/R2 | 1.70 | 0.50 | 0.25 | 0.19 | 0.53 | 0.39 |
| V1 | 55.9 | 55.9 | 55.9 | 55.9 | 56.1 | 55.9 |
| V2 | 55.9 | 56.1 | 56.1 | 56.1 | 56.1 | 56.1 |

However, those skilled in the art should know that the number of the lenses forming the optical imaging lens assembly may be changed without departing from the technical solutions claimed in the disclosure to achieve each result and advantage described in the specification. For example, although descriptions are made in the implementation with four lenses as an example, the optical imaging lens assembly is not limited to four lenses. If necessary, the optical imaging lens assembly may further include another number of lenses.

In an exemplary implementation mode, the disclosure also provides a photographic device, which is provided with an electronic photosensitive element for imaging. The electronic photosensitive element may be a Charge Coupled Device (CCD) or a Complementary Metal Oxide Semiconductor (CMOS). The photographic device may be an independent photographic device such as a digital camera, or may be a photographic module integrated into a mobile electronic device such as a mobile phone. The photographic device is provided with the abovementioned optical imaging lens assembly.

The exemplary embodiments of the disclosure are described above with reference to the drawings. It should be understood by those skilled in the art that the abovementioned embodiments are only examples for a purpose of description and not intended to limit the scope of the disclosure. Any modifications, equivalent replacements and the like made within the teachings of the disclosure and the scope of protection of the claims shall fall within the scope claimed by the disclosure.

What is claimed is:

1. An optical imaging lens assembly, sequentially comprising, from an object side to an image side along an optical axis:
a first lens with a negative refractive power;
a second lens with a refractive power, an image-side surface thereof being a convex surface;
a third lens with a refractive power, an object-side surface thereof being a convex surface; and
a fourth lens with a negative refractive power, an object-side surface thereof being a convex surface while an image-side surface being a concave surface, wherein
ImgH is a half of a diagonal length of an effective pixel region on an imaging surface of the optical imaging lens assembly, and a spacing distance T12 of the first lens and the second lens on the optical axis, a spacing distance T23 of the second lens and the third lens on the optical axis and ImgH satisfy: $0.4<(T12+T23)/ImgH<0.6$;
an effective focal length f2 of the second lens and a curvature radius R2 of an image-side surface of the first lens satisfy: $0.1<f2/R2<1.8$.

2. The optical imaging lens assembly according to claim 1, wherein the optical imaging lens assembly further comprises a diaphragm, the diaphragm is arranged between the first lens and the second lens.

3. The optical imaging lens assembly according to claim 1, wherein TTL is a distance from an object-side surface of the first lens to the imaging surface of the optical imaging lens assembly on the optical axis, and a center thickness CT2 of the second lens on the optical axis, a center thickness CT3 of the third lens on the optical axis and TTL satisfy: $1.4<(CT2+CT3)/TTL\times5<1.9$.

4. The optical imaging lens assembly according to claim 1, wherein an effective radius DT22 of the image-side surface of the second lens, an effective radius DT32 of an image-side surface of the third lens and an effective radius DT42 of the image-side surface of the fourth lens satisfy: $1.0<(DT22+DT32)/DT42<1.3$.

5. The optical imaging lens assembly according to claim 1, wherein ImgH is a half of the diagonal length of the effective pixel region on the imaging surface of the optical imaging lens assembly, and an effective radius DT11 of an object-side surface of the first lens, an effective radius DT12 of an image-side surface of the first lens and ImgH satisfy: $0.8<(DT11+DT12)/ImgH<1.2$.

6. The optical imaging lens assembly according to claim 1, wherein Semi-FOV is a half of a maximum field of view of the optical imaging lens assembly, and Semi-FOV satisfies: $55°\leq Semi\text{-}FOV\leq70°$.

7. The optical imaging lens assembly according to claim 1, wherein an effective focal length f4 of the fourth lens and an effective focal length f1 of the first lens satisfy: $0.1<f4/f1<1$.

8. The optical imaging lens assembly according to claim 1, wherein an effective focal length f2 of the second lens, an effective focal length f3 of the third lens and an effective focal length f of the optical imaging lens assembly satisfy: $2.3<(f2+f3)/f<3.8$.

9. The optical imaging lens assembly according to claim 1, wherein a curvature radius R4 of the image-side surface of the second lens and a curvature radius R6 of an image-side surface of the third lens satisfy: $0.2<R4/R6<2.3$.

10. The optical imaging lens assembly according to claim 1, wherein a curvature radius R7 of the object-side surface of the fourth lens and a curvature radius R8 of the image-side surface of the fourth lens satisfy: $1.5<R7/R8<2.7$.

11. The optical imaging lens assembly according to claim 1, wherein an Abbe number V1 of the first lens satisfies: $V1>55$, and an Abbe number V2 of the second lens satisfies: $V2>55$.

12. An optical imaging lens assembly, sequentially comprising, from an object side to an image side along an optical axis:
a first lens with a negative refractive power;
a second lens with a refractive power, an image-side surface thereof being a convex surface;
a third lens with a refractive power, an object-side surface thereof being a convex surface; and
a fourth lens with a negative refractive power, an object-side surface thereof being a convex surface while an image-side surface being a concave surface, wherein
TTL is a distance from an object-side surface of the first lens to an imaging surface of the optical imaging lens assembly on the optical axis, and a center thickness CT2 of the second lens on the optical axis, a center thickness CT3 of the third lens on the optical axis and TTL satisfy: $1.4<(CT2+CT3)/TTL\times5<1.9$;
an effective focal length f2 of the second lens and a curvature radius R2 of an image-side surface of the first lens satisfy: $0.1<f2/R2<1.8$.

13. The optical imaging lens assembly according to claim 12, wherein the optical imaging lens assembly further comprises a diaphragm, the diaphragm is arranged between the first lens and the second lens.

14. The optical imaging lens assembly according to claim 12, wherein ImgH is a half of a diagonal length of an effective pixel region on the imaging surface of the optical imaging lens assembly, and a spacing distance T12 of the first lens and the second lens on the optical axis, a spacing distance T23 of the second lens and the third lens on the optical axis and ImgH satisfy: $0.4<(T12+T23)/ImgH<0.6$.

15. The optical imaging lens assembly according to claim 12, wherein an effective radius DT22 of the image-side surface of the second lens, an effective radius DT32 of an image-side surface of the third lens and an effective radius DT42 of the image-side surface of the fourth lens satisfy: $1.0<(DT22+DT32)/DT42<1.3$.

16. The optical imaging lens assembly according to claim 12, wherein ImgH is a half of a diagonal length of an effective pixel region on the imaging surface of the optical imaging lens assembly, and an effective radius DT11 of an object-side surface of the first lens, an effective radius DT12 of an image-side surface of the first lens and ImgH satisfy: $0.8<(DT11+DT12)/ImgH<1.2$.

17. The optical imaging lens assembly according to claim 12, wherein Semi-FOV is a half of a maximum field of view of the optical imaging lens assembly, and Semi-FOV satisfies: $55°<Semi\text{-}FOV\leq70°$.

18. The optical imaging lens assembly according to claim 12, wherein an effective focal length f4 of the fourth lens and an effective focal length f1 of the first lens satisfy: $0.1<f4/f1<1$.

19. The optical imaging lens assembly according to claim 12, wherein an effective focal length f2 of the second lens, an effective focal length f3 of the third lens and an effective focal length f of the optical imaging lens assembly satisfy: 2.3<(f2+f3)/f<3.8.

\* \* \* \* \*